US009589416B2

(12) United States Patent
Berman et al.

(10) Patent No.: US 9,589,416 B2
(45) **Date of Patent: *Mar. 7, 2017**

(54) GAMING METHOD AND APPARATUS FOR PORTIONING A PLAY AREA

(71) Applicant: KING SHOW GAMES, INC., Minnetonka, MN (US)

(72) Inventors: Bradley Berman, Minnetonka, MN (US); Adam Martin, St. Louis Park, MN (US); Ryan Strand, Hopkins, MN (US); Chad Shapiro, Plymouth, MN (US); Nate Norbie, Chaska, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/237,629

(22) Filed: Aug. 15, 2016

(65) Prior Publication Data

US 2016/0358413 A1 Dec. 8, 2016

Related U.S. Application Data

(63) Continuation of application No. 14/875,390, filed on Oct. 5, 2015, now Pat. No. 9,418,505, which is a continuation of application No. 12/711,905, filed on Feb. 24, 2010, now Pat. No. 9,153,091.

(60) Provisional application No. 61/155,262, filed on Feb. 25, 2009.

(51) Int. Cl.

| | |
|---|---|
| ***G06F 17/00*** | (2006.01) |
| ***G06F 19/00*** | (2011.01) |
| ***G07F 17/32*** | (2006.01) |
| ***G07F 17/34*** | (2006.01) |

(52) U.S. Cl.

CPC ...... *G07F 17/3213* (2013.01); *G07F 17/3209* (2013.01); *G07F 17/3225* (2013.01); *G07F 17/3244* (2013.01); *G07F 17/3267* (2013.01); *G07F 17/3293* (2013.01); *G07F 17/34* (2013.01)

(58) Field of Classification Search

CPC .. G07F 17/32; G07F 17/3204; G07F 17/3211; G07F 17/3244; G07F 17/326; G07F 17/3262; G07F 17/3265; G07F 17/3267; G07F 17/3286; G07F 17/34

See application file for complete search history.

(56) References Cited

U.S. PATENT DOCUMENTS

| | | | |
|---|---|---|---|
| 5,303,929 | A | 4/1994 | Sandeen |
| 6,027,117 | A | 2/2000 | Goldberg |
| 6,346,043 | B1 | 2/2002 | Colin et al. |
| 6,544,120 | B2 | 4/2003 | Ainsworth |
| 6,572,471 | B1 | 6/2003 | Bennett |
| 6,802,775 | B2 | 10/2004 | Baerlocher et al. |
| 6,805,632 | B2 | 10/2004 | Suda |
| 6,869,360 | B2 | 3/2005 | Marks et al. |

(Continued)

*Primary Examiner* — Milap Shah

(57) ABSTRACT

A method and apparatus for use in gaming activities, such as in a slot machine. A first grid comprising a plurality of elements overlayed a second grid comprising a plurality of elements is presented. At least some of the elements of the first grid and the second grid are marked. Marked elements of first grid are then used to form a subportion, the subportion boundary enclosing an area and having a correspondingly marked element of the first grid at each corner. Payouts are issued for marked elements and element combinations of the second grid within the subportion. The payouts may be administered according to a pay table.

20 Claims, 9 Drawing Sheets

(56) References Cited

U.S. PATENT DOCUMENTS

| | | | |
|---|---|---|---|
| 6,875,106 | B2 | 4/2005 | Weiss et al. |
| 7,192,347 | B1 | 3/2007 | Marks et al. |
| 7,410,420 | B2 | 8/2008 | Shiraishi |
| 7,578,735 | B2 | 8/2009 | Frizzell et al. |
| 7,686,686 | B2 | 3/2010 | Marks et al. |
| 8,444,473 | B2 | 5/2013 | Ching et al. |
| 8,662,986 | B2 | 3/2014 | Rodgers et al. |
| 9,153,091 | B2 | 10/2015 | Berman et al. |
| 9,418,505 | B2 * | 8/2016 | Berman .................. G07F 17/32 |
| 2002/0055382 | A1 | 5/2002 | Meyer |
| 2003/0092480 | A1 | 5/2003 | White et al. |
| 2004/0033827 | A1 | 2/2004 | Gilmore et al. |
| 2004/0097280 | A1 | 5/2004 | Gauselmann |
| 2005/0093240 | A1 | 5/2005 | Jones et al. |
| 2005/0096114 | A1 | 5/2005 | Cannon et al. |
| 2005/0096117 | A1 | 5/2005 | Katz et al. |
| 2005/0096121 | A1 | 5/2005 | Gilliland et al. |
| 2005/0096123 | A1 | 5/2005 | Cregan et al. |
| 2005/0096124 | A1 | 5/2005 | Stronach |
| 2005/0096130 | A1 | 5/2005 | Mullins |
| 2005/0288087 | A1 | 12/2005 | Meyer |
| 2007/0026923 | A1 | 2/2007 | Muir |
| 2007/0232383 | A1 | 10/2007 | Berman |
| 2008/0176620 | A1 | 7/2008 | Berman et al. |
| 2008/0176634 | A1 | 7/2008 | Berman et al. |
| 2008/0227541 | A1 | 9/2008 | Berman et al. |
| 2008/0287178 | A1 | 11/2008 | Berman et al. |
| 2010/0178976 | A1 | 7/2010 | Berman et al. |
| 2010/0279758 | A1 | 11/2010 | Miglbauer |

* cited by examiner

GAMING METHOD AND APPARATUS FOR PORTIONING A PLAY AREA

RELATED APPLICATIONS

This application is a continuation of U.S. application Ser. No. 14/875,390, filed Oct. 5, 2015, now U.S. Pat. No. 9,418,505, which is a continuation of U.S. application Ser. No. 12/711,905, filed Feb. 24, 2010, now U.S. Pat. No. 9,153,091, which claims the benefit of Provisional Patent Application No. 61/155,262, filed on Feb. 25, 2009, to which priority is claimed pursuant to 35 U.S.C. §119(e), all of which are incorporated herein by reference in their entirety.

FIELD OF THE INVENTION

This invention relates in general to gaming systems and processes, and more particularly to gaming methods and apparatuses for portioning a play area.

BACKGROUND OF THE INVENTION

Gaming devices such as slot machines have entertained the public for over a century. While the fundamental concept behind slot games has remained relatively intact, the manners of computing, displaying, and participating in modern day slot games have changed dramatically. One force driving these changes is technological advancement, such as the advent of computers and video capabilities. Another driving force is human nature, as the participants of such gaming devices demand continual excitement and stimulation. It is therefore important in the gaming industry that gaming innovations continue to be rolled out to the participating public.

SUMMARY

To overcome limitations in the prior art described above, and to overcome other limitations that will become apparent upon reading and understanding the present specification, the present invention discloses an apparatus and method for portioning a gaming play area.

Various embodiments of the invention concerns a method of facilitating a game, comprising marking at least some elements of a first grid, marking at least some elements of a second grid, the second grid overlapping with at least a portion of the first grid, activating at least a portion of the first grid, at least some correspondingly marked elements of the second grid framing the activated portion of the first grid and causing the portion to be activated, and evaluating at least some elements of the first grid to identify winning combinations of element markings within the activated portion. In various method embodiments, the second grid is overlapping with the first grid such that each element of the second grid is located adjacent to at least one corner of an element of the first grid. In various method embodiments, the first grid and the second grid are patterned and spaced such that the elements of the second grid are located at intersection of grid lines of the first grid. In various method embodiments, the first grid and the second grid are patterned and spaced such that the elements of the first grid are located at intersection of grid lines of the second grid. Various method embodiments may also comprise issuing a payout based on one or more identified winning combinations. In various method embodiments, evaluating the at least some elements of the first grid further comprises adding values associated with the markings of the elements of the first grid that are within the activated portion of the first grid to calculate a payout. Various method embodiments may further comprise evaluating at least some elements of the first grid to identify winning combinations of element markings outside of the activated portion, wherein payouts associated with elements of the first grid within the activated portion are augmented by a bonus based on those elements being within the activated portion. Various method embodiments may further comprise evaluating at least some elements of the first grid to identify winning combinations of element markings outside of the activated portion, wherein a bonus is applied to one or more elements within the activated portion to increase the odds of winning combination formation, the bonus not being applied outside of the activated portion. Various method embodiments may further comprise evaluating at least some elements of the first grid to identify winning combinations of element markings outside of the activated portion, wherein a first set of rules for win formation is used for elements of the first grid not within the activated portion and a second set of rules for win formation is used for elements of the first grid that are within the activated portion, the first set of rules different from the second set of rules. Various method embodiments may further comprise applying a bonus to at least one element based on the at least one element being within the activated portion. Various method embodiments may further comprise forming one or more poker hands, wherein each hand is formed from markings of elements of the first grid within a respective activated portion. In various method embodiments, marking at least some elements of the second grid further comprises using a plurality of different markings types, activating the portion of the first grid further comprises activating a plurality of different portion types based on which of the plurality of different markings types are used to frame each respective portion of the first grid, and evaluating at least some elements of the first grid to identify winning combinations further comprises evaluating each different portion type of the plurality separately from the other different portion types.

Various embodiments of the invention concern a computer-readable medium having instructions stored thereon which are executable y the processor for facilitating a game having a plurality of rounds by performing steps comprising marking at least some elements of a first grid, marking at least some elements of a second grid, the second grid overlapping with at least a portion of the first grid, activating at least a portion of the first grid, at least some correspondingly marked elements of the second grid framing the activated portion of the first grid and causing the portion to be activated, and evaluating at least some elements of the first grid to identify winning combinations of element markings within the activated portion. In various embodiments, the computer-readable medium has further instructions stored thereon which are executable by the processor for facilitating the game such that the second grid is overlapping with the first grid such that each element of the second grid is located adjacent to at least one corner of an element of the first grid; the first grid and the second grid are patterned and spaced such that the elements of the second grid are located at intersection of grid lines of the first grid; and/or the first grid and the second grid are patterned and spaced such that the elements of the first grid are located at intersection of grid lines of the second grid. In various embodiments, the computer-readable medium may have further instructions stored thereon which are executable by the processor for facilitating the game to perform one or more of the steps comprising issuing a payout based on one or more identified winning combinations, adding values associated with the markings of the elements of the first grid that are within the activated portion of the first grid to calculate a payout, evaluating at least some elements of the first grid to identify winning combinations of element markings outside of the activated portion wherein payouts associated with elements of the first grid within the activated portion are augmented by a bonus based on those elements being within the activated portion; evaluating at least some elements of the first grid to identify winning combinations of element markings outside of the activated portion wherein a bonus is applied to one or more elements within the activated portion to increase the odds of winning combination formation, the bonus not being applied outside of the activated portion; evaluating at least some elements of the first grid to identify winning combinations of element markings outside of the activated portion, wherein a first set of rules for win formation is used for elements of the first grid not within the activated portion and a second set of rules for win formation is used for elements of the first grid that are within the activated portion, the first set of rules different from the second set of rules; applying a bonus to at least one element based on the at least one element being within the activated portion; forming one or more poker hands wherein each hand is formed from markings of elements of the first grid within a respective activated portion. In various embodiments, the computer-readable medium has further instructions stored thereon which are executable by the processor for facilitating the game such that marking at least some elements of the second grid further comprises using a plurality of different markings types, activating the portion of the first grid further comprises activating a plurality of different portion types based on which of the plurality of different markings types are used to frame each respective portion of the first grid, and evaluating at least some elements of the first grid to identify winning combinations further comprises evaluating each different portion type of the plurality separately from the other different portion types. Various embodiments may be configured to perform the same steps and functions as described above by use of a display device and specially configured circuitry and may have less or no reliance on computer-readable medium having instructions stored thereon which are executable by a processor to perform the identified steps. These and other means for performing the various steps referenced herein are contemplated within the scope of the present disclosure.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

The invention is described in connection with the embodiments illustrated in the following diagrams.

DETAILED DESCRIPTION OF THE ILLUSTRATED EMBODIMENTS

In the following description of the invention, reference is made to the accompanying drawings which form a part hereof, and in which is shown by way of illustration the specific embodiment in which the invention may be practiced. It is to be understood that other embodiments may be utilized, as structural and operational changes may be made without departing from the scope of the present invention.

Generally, the present invention is directed to systems, methods and apparatuses for portioning a play area.

The present invention, as described more fully below, is applicable to various gaming activities that are played on a gaming board or gaming machine, including slot games such as reel slots and video slots, and other games utilizing individual, combinations or a string of symbols to generate a game result. The present invention is described in terms of slot machines to provide an understanding of the invention. While the invention is particularly advantageous in the context of slot machines, and while a description in terms of slot machines facilitates an understanding of the invention, the invention is also applicable to other gaming activities of chance utilizing symbol strings as will be readily apparent to those of skill in the art from the description provided herein.

As is described more fully below, the present invention provides apportionment of a gaming play area. However, the invention is equally applicable in connection with secondary modes, such as bonus modes of play. As is known in the art, bonus events are used in gaming activities such as slot games, which provides an alternative mode of play that is intended to attract and captivate players of such slot games. Generally, a bonus game or event on a slot machine is typically an additional gaming reel or machine, or a random selection device, that is enabled by a bonus qualifying signal from an underlying or primary gaming activity. Generally, a predetermined prize-winning combination of symbols in an underlying or primary slot game may result in the player being awarded one or more bonus games. Often the bonus event has a much higher probability of winning, thereby instilling a great interest by players in being awarded bonus events. There are various secondary or "bonus" events known in the art. Thus, while an exemplary embodiment of the present invention is described in connection with a standard or primary mode of play, the present invention is equally applicable in secondary or bonus modes of play.

Figure 1A:
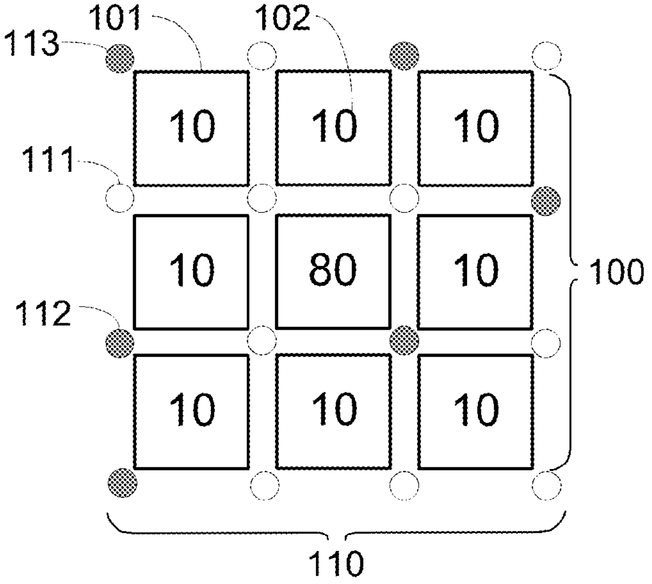
FIGS. 1A-B illustrate an embodiment of a gaming activity for portioning a play area in accordance with aspects of the invention.
Figure 1B:
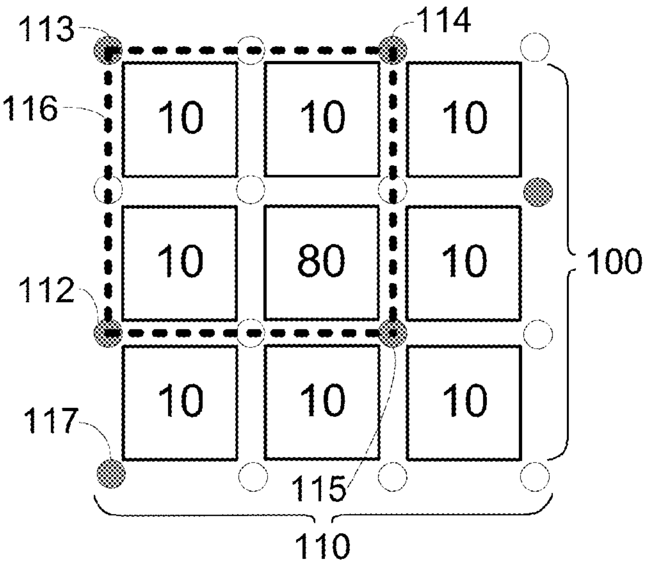

FIGS. 1A-B illustrates an embodiment of the invention for portioning a play area. FIG. 1A includes a first element grid 100 comprised of elements, such as element 101. All of the elements of the first element grid 100 are illustrated as squares, but in various other embodiments of the invention, the elements could be other shapes, including but not limited to circles, ovals, triangles, pentagons, hexagons, octagons, and the like. Each element of the first element grid 100 is illustrated as including four sides and four corners. Also, the elements of the first element grid 100 are spaced apart.

The embodiment of FIG. 1A also includes a second element grid 110 overlaid the first element grid 100. The second element grid 110 is composed of elements, such as elements 111 and 112. All of the elements of the second element grid 110 are illustrated as circles, but in various other embodiments of the invention, the elements could be other shapes, including but not limited to squares, ovals, triangles, pentagons, hexagons, octagons, and the like. The elements of the second element grid 110 are spaced apart.

All elements of the first element grid 100 have been marked with a numeral, such as numeral marking 102. In the particular embodiment of FIG. 1A, the markings of the elements of the first element array 100 are values which can be won and issued as a payout if certain conditions are met during game play.

Some elements of the second element grid 110 have been marked, such as element 112. The elements of the second element gird 110 that are marked, such as element 112, show their marked status by being a darker color than the unmarked elements, such as unmarked element 111. The marking done to the second element grid 110 is different from that done to the first element grid 100. For example, while all elements of the first element grid 100 have been marked, only some of the elements of the second element grid 110 have been marked. Markings of elements of a second grid as presented in this disclosure can include lighting a light (actual bulb or by video display) in the position of the element, whereby lights that go unlit are unmarked by the marking process.

While only some of the elements of the second element grid 110 have been marked in the particular embodiment of FIG. 1A, in some embodiments of the invention all elements of the second element grid 110 could be marked and yet the second element grid 110 would appear the same as in FIG. 1A. In such embodiments, some elements are marked as dark elements, such as element 112, and some elements are marked as light elements, such as element 111. However, in the particular embodiment of FIG. 1A, only those elements of the second element grid 110 that display a dark color are marked.

Marking includes distinguishing at least one element from at least one other element. There are many ways in which one element can be distinguished from another element, and therefore there are many different ways to mark an element. For example, an element could be marked simply by it being created or located in a play area. Marking can also include placing and/or representing a symbol, one or more colors, flag, character, image, graphic, number, letter, shape, feature, or design on an element.

Marking is not limited to elements. Various types of play area components of the present invention can also be marked. For example, boundaries, grid spaces, voids, sides, corners and the like can also be marked. Moreover, a particular part of an element can be marked, such as a side or a corner of an element.

One element can be distinguished from another element by locating the elements at different heights, rotating one or both of the elements, flipping one or both of the elements, moving one or both of the elements, resizing one of both of the elements, deforming one or both of the elements, modifying one or both of the elements and/or combining one or both of the elements with at least one other element. Distinguishing of elements can be done to physical elements, such as element pieces of a board or on a reel strip. Distinguishing of elements can also be represented on a display screen.

In various embodiments of the invention, a particular type of marking from a plurality of different possible markings can be repeatedly used to mark grid elements. In other embodiments, a particular type of marking from the plurality of different possible markings can only be used to mark grid elements a certain number of times. For example, a particular grid may only have four sun symbols with which to mark elements of the grid.

According to the particular embodiment of FIG. 1A, elements of the second element grid 110 that are marked correspond. Therefore, elements 112 and 113 correspond to each other. Elements not marked do not correspond to one another and elements of the first element grid 100 do not correspond to the elements of the second element grid 110, however various other embodiments of the invention are not so limited.

While elements 112 and 113 correspond to one another because each has been marked, there are various other ways in which elements can correspond to one another, according to various embodiments of the inventions. For example, elements could correspond to one another because each is marked with an identical or similar marking, yet the marking alone is not enough to classify the elements as corresponding to one another. In some embodiments, elements not marked will correspond to one another. In some embodiments of the invention, elements will only correspond if they have the same letter, number, symbol, image, color, or other similar marking. In some embodiments of the invention, elements will correspond if they are marked with markings selected from a particular group, and the elements need not all have identical markings to correspond to one another. For example, elements of a corresponding series of marked elements may correspond because each is marked with an image of a dog, even though all image markings on the elements are of a different breed of dog.

In some embodiments of the invention, elements correspond to one another if their markings form a progressive series. In such embodiments, adjacent elements might only correspond if they are marked with consecutive numbering. In other embodiments, letter marked elements of a segment may only correspond if the adjacent elements spell a word. However, the present invention is not so limited. Other types of element correspondence are contemplated and should be realized by one or ordinary skill in the art upon reading this disclosure. For example, marked elements may correspond because, according to a pay table, the combination of the elements triggers a payout.

Marking can be done in various ways. For example, some elements can be randomly marked, such that there is a probability that a particular element will be marked or not marked. Determining whether a particular element will be marked can be done by various means, including random number generation, as discussed herein. If an element is selected to be marked, then another step can be taken to determine which of the possible different types of markings will be used to mark the particular element. However, in some embodiments only one type of marking is available. Moreover, in some embodiments of the invention, a process is conducted to randomly select a particular marking for an element, and amongst the different marking outcomes that can selected is an outcome where the element is not marked.

In some embodiments of the invention, only a certain number of elements will be marked and some of the elements will be left unmarked. In some embodiments of the invention, certain elements will always be marked or will always be marked the same way each game while other elements will be randomly marked each game. For example, certain elements of the second element grid 110 could also be marked without reliance on a random marking process, while the remaining elements of the second element grid are randomly marked or nor marked. In some embodiments, the markings of one or more elements of a second element grid, such as second element grid 110, can be purchased by a player, such a purchase increasing the odds for favorable outcomes as will be further explained.

In some embodiments of the invention, all elements of a particular type or grid will be marked and a random number generator or other selection means will be used to determine the particular marking for each element of the type or grid.

FIG. 1B illustrates the embodiment of FIG. 1A in a later stage of game play. The markings of the elements in FIG. 1A remain in FIG. 1B and are used to both form a subportion of the first element array 100 and determine a payout. Elements 112, 113, 114, and 115 correspond to one another because each is marked. Elements 112, 113, 114, and 115 also form the corners of subportion boundary 116. According to the embodiment of FIG. 1B, the subportion boundary 116 is formed by a group of correspondingly marked elements of the second element grid 110, a correspondingly marked element located at each corner of the subportion boundary 116.

The subportion boundary 116 of FIG. 1B is a square, and a correspondingly marked element is located at each corner of the square. In various embodiments of the invention, a subportion is an area enclosed by a subportion boundary, the subportion boundary formed by lines connecting correspondingly marked elements of a grid, one of the correspondingly marked elements at each corner of the subportion of the boundary. Such lines might be straight and follow horizontal and vertical grid lines. In the particular embodiment of FIGS. 1A-B, the lines connecting the correspondingly marked elements cannot overlap elements of the first element grid 100. In various embodiments of the invention, the lines connecting correspondingly marked elements that enclose a portion of a column and row grid must only be positioned along the grid columns and rows and cannot be positioned in a diagonal or in curving manner.

As used herein, a first grid of elements refers to a base of elements to be populated with markings that alone or in combination can trigger wins and payouts while a second grid of elements refers to framing elements arranged to overlap with at least a portion of the first grid of elements and when marked in a particular manner frame a subportion of the first grid of elements, thereby activating those elements/portion of the first grid within the subportion to receive some benefit that is not provided to those elements/portions of the first grid outside of the subportion.

Marked element 117 does correspond to elements 112, 113, 114, and 115, but marked element 117 is not used to form a subportion boundary. According to the embodiment of FIG. 1B, marked element 117 cannot be used to form a subportion boundary because an area could not be enclosed by a subportion boundary that has a corresponding marking at each corner of the subportion boundary, one of those correspondingly marked elements being marked element 117.

According to the embodiment of FIG. 1B, the marked values of the elements located within the subportion boundary 116 of the first element grid 100 are summed to calculate a payout. Therefore, the payout issued in the embodiment of FIG. 1B is 110 (10+10+10+80=110).

In some embodiments, numbers are marked to each element of a first grid, but these numbers are not necessarily values. The numbers of elements that are within a subportion are then put together to determine a payout. For example, three different elements could be marked with respective 2, 9, and 5 numeral markings. If these elements are the only elements of a subportion, then a payout could be 295 credits in the manner that the elements are arrayed. Alternatively, the aggregate payouts could be determined by arranging the number from highest to lowest (952) or lowest to highest (259).

Figure 2:
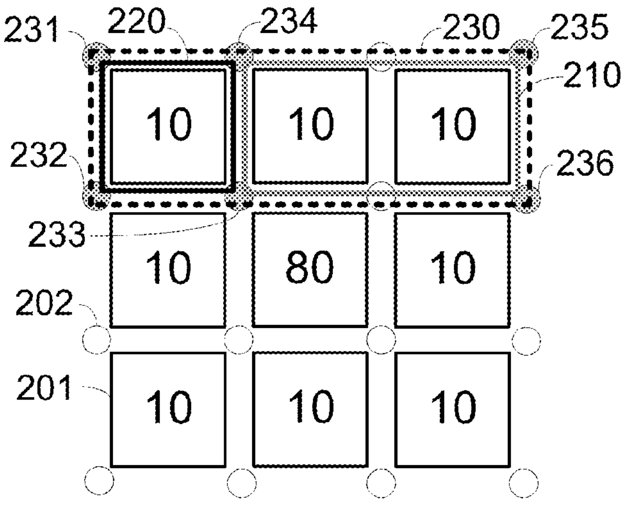
FIG. 2 illustrates another embodiment of a gaming activity for portioning a play area in accordance with aspects of the invention.

FIG. 2 illustrates another embodiment of a gaming activity for portioning a play area in accordance with the invention. FIG. 2 includes a plurality of square elements, such as element 201. Overlapping the plurality of square elements are a plurality of circular elements, such as element 202. All of the square elements have been marked with a numerical value. For example, square element 201 is marked to indicate that its numerical value is 10.

Some of the circular elements of FIG. 2 have been marked, such as elements 231, 232, 233, 234, 235 and 236. From these marked elements, several subportions are formed. For example, marked elements 233, 234, 235 and 236 form subportion boundary 210. Subportion boundary 210 is formed because marked elements 233, 234, 235 and 236 are arranged with a marked element at each corner of the subportion boundary 210, the subportion boundary 210 enclosing an area.

Marked elements can be used to form multiple subportions. Each of marked elements 231, 232, 233, 234, 235 and 236 are used to form two different subportions. For example, marked elements 231, 232, 233 and 234 form subportion boundary 220 and marked elements 231, 232, 235 and 236 form subportion boundary 230. The area enclosed by subportion boundary 220 is also enclosed by subportion boundary 230. In such a way, subportions can overlap and elements in one subportion can also be in another subportion.

In some embodiments of the disclosure, subportions and subportion boundaries can only take the form of certain shapes. For example, in some embodiments, subportions and subportion boundaries can only be squares while in some other embodiments subportions and subportion boundaries can include rectangles. As one of ordinary skill in the art will understand upon reading this disclosure, limiting the types of shapes and configuration that subportions and subportion boundaries can form limits the chances of formation of subportions and subportion boundaries. As such, in some embodiments of the invention, limiting the types of shapes of subportions and subportion boundaries can control the odds of a player winning and/or enhance game play.

Various different payout methods can be used in the embodiment of FIG. 2. For example, the respective values of each element located within a subportion can be summed to calculate a total payout. In some embodiments of the invention, the values of elements located within two overlapping subportions will be added to the summation twice. In such embodiments, a summation can be done for the elements and values of each subportion, and then a summation of all subportions can be done to calculate a total payout. In such a way, an element located within two subportions will be used twice to calculate the total payout. Other bonuses, such as multipliers, can be applied to elements and element values located within overlapping subportions where such a bonus would not have been applied had the element been in only one subportion.

Elements in different subportions can be treated differently when determining a payout. For example, elements and values of one subportion can be used to add to a payout while elements and values of another subportion can be used to subtract from a payout. Also, elements and values within one subportion can be used in a different way to calculate the payout than elements and values of another subportion. For example, the values of elements within one subportion may be first multiplied and then summed while values of elements within another subportion may not be multiplied before being summed.

While various embodiments are illustrated herein to use lines to define subportions, not all embodiments are so limited. For example, a subportion could be framed and thereby defined by having a second element marking at each corner, where no line connections need to be made between the corner framing elements of the second grid to define the subportion. Lines between corresponding second grid elements may nevertheless by graphically traced to highlight the subportion.

Figure 3:
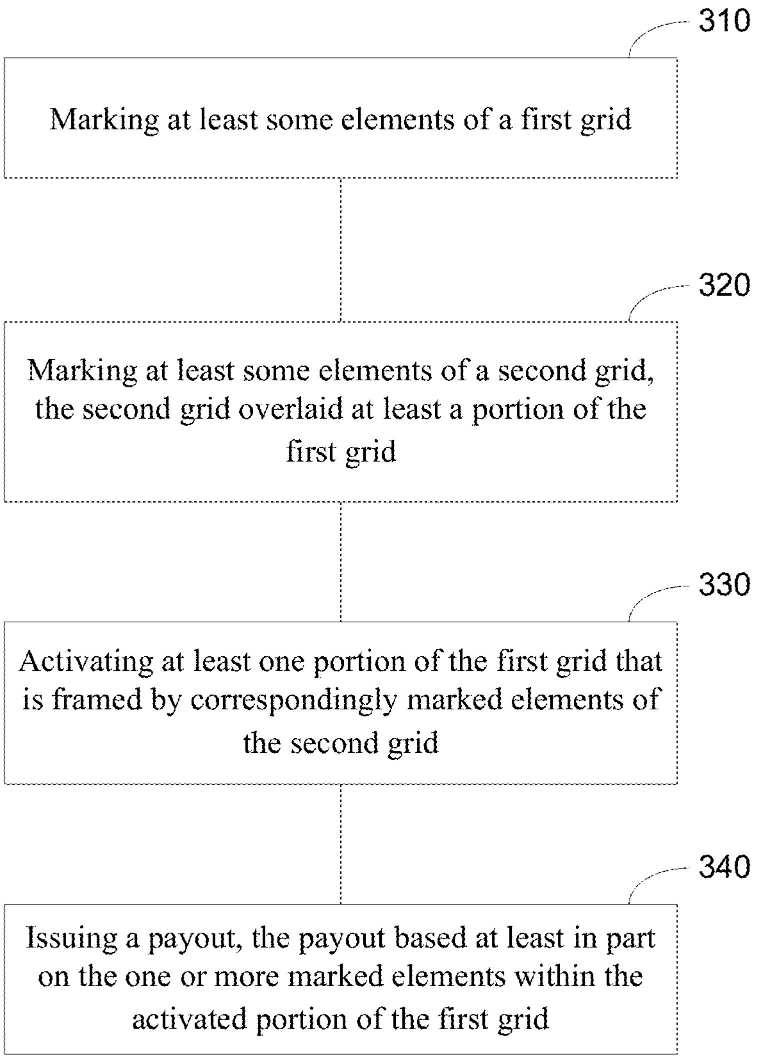
FIG. 3 is a flow diagram of an exemplary embodiment of a method for portioning a play area in accordance with aspects of the invention.

FIG. 3 is a flow diagram of an exemplary embodiment of a method for portioning a play area in accordance with the invention. The method of FIG. 3 includes marking 310 at least some elements of a first grid.

The play areas of the current invention can be presented in various ways. Play areas can include grids, arrays, patterns, and the like. Various types of grids and arrays are contemplated in the scope of the invention, including vertical and horizontal lines creating spaces of rectangles and/or squares. Grids and arrays can also be formed from elements arranged in vertical columns of elements and horizontal rows of elements. Grids and arrays can also be comprised of triangles, hexagons, ovals, circles and other shapes.

A play area can be presented in various ways. For example, a play area could be comprised of several reel strips with various markings on the periphery of the reel strips. Several reel strips with a common axis placed together can form a grid, with each reel strip representing a vertical column and adjacent markings on the aligned reels representing a horizontal row. A play area could also be printed on a surface, such as a piece of paper or board. A grid could also be represented by projected light.

A play area can also be presented by use of video means, such as with a video slot machine. In a video slot machine, the reel strips are not represented by physical material, but rather include electronically stored symbol patterns, i.e., a virtual reel strip. By using virtual reel strips for each of the display subsegments, there is no physical correlation between display subsegments as there are with mechanical reel strips. For example, in the context of mechanical reel strips, three symbols presented in a column across three paylines are physically restricted to that particular order, since the reel strip is presented across three rows. In an exemplary embodiment of the invention, there is no such relationship and each subpart of the grid can display a marking independent of any other subpart. Furthermore, there are other advantages by using video representation, including faster game play, greater flexibility in game types and variations, and representation of things that would otherwise be physically complicated or impossible.

The method of FIG. 3 further includes the step of marking 320 at least some elements of a second grid overlaid at least a portion of the first grid. There are several ways in which grids can be overlaid. For example, one grid can overlay the other merely because they overlap partially or fully. The term overlaid is used herein to describe the overlapping nature between first and second element grids, and not to necessarily imply that one element grid is spatially on top of or in front of the other element grid.

Marking of the two grids can be done in similar or different ways, and can be done by any means discussed herein or otherwise known in the art. While the method of FIG. 3 states that the first grid is marked before the second grid, the invention is not so limited. For example, the second grid could be marked before the first grid, or both grids could be marked at the same time. The grid may be presented or populated with pre-marked elements. Alternatively, a particular grid, or a portion of the grid, may only be marked or populated by marked elements if a portion of the grid is activated by correspondingly marked elements of another grid forming a subportion boundary around the unmarked elements/unpopulated element areas.

A subportion can be defined automatically, such as by use of instructions stored in memory and executed by a processor. A subportion could also be defined manually by a user. For example, a game player may be given the opportunity to position the subportion boundaries using the corresponding elements.

The method of FIG. 3 further includes activating 330 at least one portion of the first grid that is framed by correspondingly marked elements of the second grid. The portion activated can be a subportion of the grid enclosed by a subportion boundary, the subportion boundary having a correspondingly marked element at each corner of the subportion boundary. Activation can occur by the formation of the subportion boundary that enclosed the subportion to be activated.

In some embodiments of the invention, once a portion of a grid is activated, the elements of the activated portion are then evaluated to determine whether a winning element marking or combination of element markings is present and whether a payout is warranted.

The current invention contemplates all payout calculation methods disclosed herein or known in the art. For example, an award may be given for every element within the activated portion, the amount of the award corresponding with a value associated with the marking of the element. If multiple elements are within the activated portion, then the values can be summed.

Payouts can also be calculated according to scatter pay methods. A scatter pay method identifies a number of corresponding elements in a particular area and issues a payout for the corresponding elements. In various embodiments of the invention, a scatter pay payout is warranted if the number of corresponding elements meets or exceeds a threshold number. For example, an embodiment may require that at least three corresponding symbols appear in any one activated portion to warrant a payout.

Payouts can also be calculated according to element series methods. An element series method identifies series of corresponding adjacent elements and issues a payout for the series. There are many different ways in which elements of the various embodiments of the invention can be adjacent to one another. According to various embodiments of the invention, elements in contact with and/or within close proximity to one another can be considered to be adjacent. Elements can be in contact with one another by sharing walls, lines, points, segments, portions and/or features. Elements can also be in contact by overlapping each other. Other types of adjacency may be provided as well. For example, in one embodiment, only those symbols that are adjacent in a horizontal or vertical fashion will be deemed “adjacent” for purposes of providing a payout. Alternatively, only symbols that are horizontal, or that are vertical, or that are diagonal, may be deemed adjacent. Symbols may also be deemed adjacent along opposite edges of the play area, as if the edges were wrapped around to intersect with one another. Three dimensional play areas may also be used in accordance with the invention, such that elements sharing a wall, corner or segment may be considered to be adjacent.

Series of corresponding adjacent elements can be dynamically identified. Dynamic identification includes locating element series or segments that can take any number of forms. As opposed to classic three reel strip slot matching, where a series of winning symbols could only be formed along one row, dynamic identification allows segments to be formed in many other ways, including series and segments that repeatedly change direction along their length.

The method of FIG. 3 further includes issuing 340 a payout, the payout based at least in part on the one or more marked elements within the activated portion of the first grid. In various embodiments of the invention, payouts can also be calculated and issued for combinations found outside or partially within the subportion. In such embodiments, certain bonuses may be given for combinations within the subportion, such as a multiplier bonus, or other types of bonuses either discussed herein or known in the art.

In some embodiments of the invention, three or more grids could be overlaid such that corresponding elements of one grid portion subportions one or more of the other grids. Also, an embodiment can be configured such that an additional grid is added, overlaid each subportion, whenever a subportion is activated/created.

In various embodiments of the invention, a game player may be presented with several different subportions formed from a number of different corresponding element combination located in an element grid and the game player may be allowed to choose amongst the subportions which subportion the game player would like to evaluate for payouts or use for a bonus feature associated with the subportion. In such embodiments, a game player might forgo a potential payout in one subportion in order to take advantage of a potential payout in another subportion. In such embodiments, the game player may be allowed to activate and/or deactivate corresponding elements and/or subportions. Player selection of corresponding elements and/or subportions and/or activation/deactiviation of corresponding elements and/or subportions improves player enjoyment because a player is provided with greater control and allows the player to form and apply strategy to the game.

Figure 4:
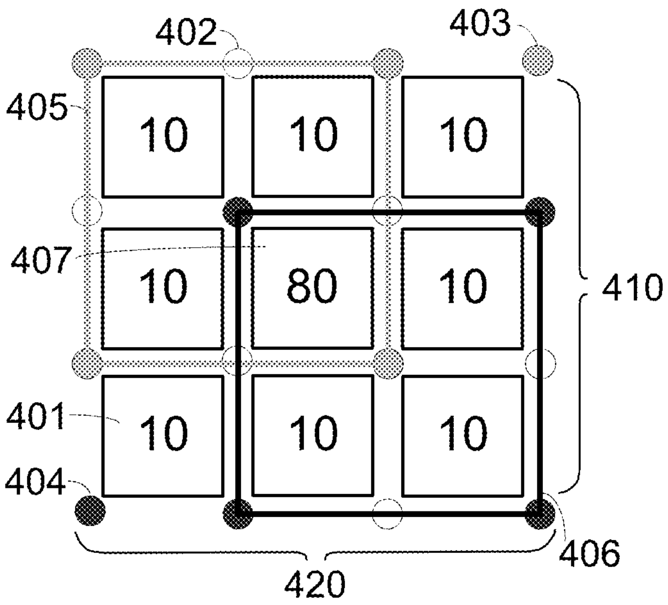
FIGS. 4-7 illustrate additional embodiments of gaming activities for portioning a play area in accordance with aspects of the invention.

FIG. 4 illustrates an additional embodiment of a gaming activity for portioning a play area in accordance with the invention. The embodiment of FIG. 4 includes a second element array 420 comprising circular elements, such as elements 403 and 404. Some of the elements of the second element array 420 have been marked. For example, element 403 was marked with a light marking and element 404 was marked with a dark marking. According to the particular embodiment of FIG. 4, elements marked with different colored markings cannot correspond to one another and therefore cannot be used together to form a subportion boundary or portion a particular area. However, the use of multiple types of markings in the first element array 420 can allow different types of subportions to be formed. For example, two subportions are created by the elements of second element array 420, one subportion within subportion boundary 405 and another subportion within subportion boundary 406.

Element 402 has not been marked, as according to the particular embodiment of FIG. 4 elements of the second element array 420 are randomly selected to be marked, and not all elements of the first element array 420 are marked. However, in various embodiments of the disclosure, nonmarked elements, or elements marked as white elements, can correspond to one another and define subportions. However, in the embodiment of FIG. 4, no subportion can be formed by the nonmarked elements of element array 420 because they do not frame an enclosed area with a corresponding nonmarked element at each corner of the subportion boundary.

FIG. 4 further includes first element array 410 composed of marked elements, such as element 401. Elements located within subportions, such as elements within subportion boundaries 405 and 406, are evaluated to determine a payout. According to the particular embodiment of FIG. 4, only those elements in a subportion are used to calculate a payout. A payout from one subportion may be calculated differently than the payout from another subportion. For example, marked values associated with each element within subportion boundary 405 may be summed to calculate a payout while marked values associated with each element within subportion boundary 406 may be multiplied to calculate a payout.

Figure 5:
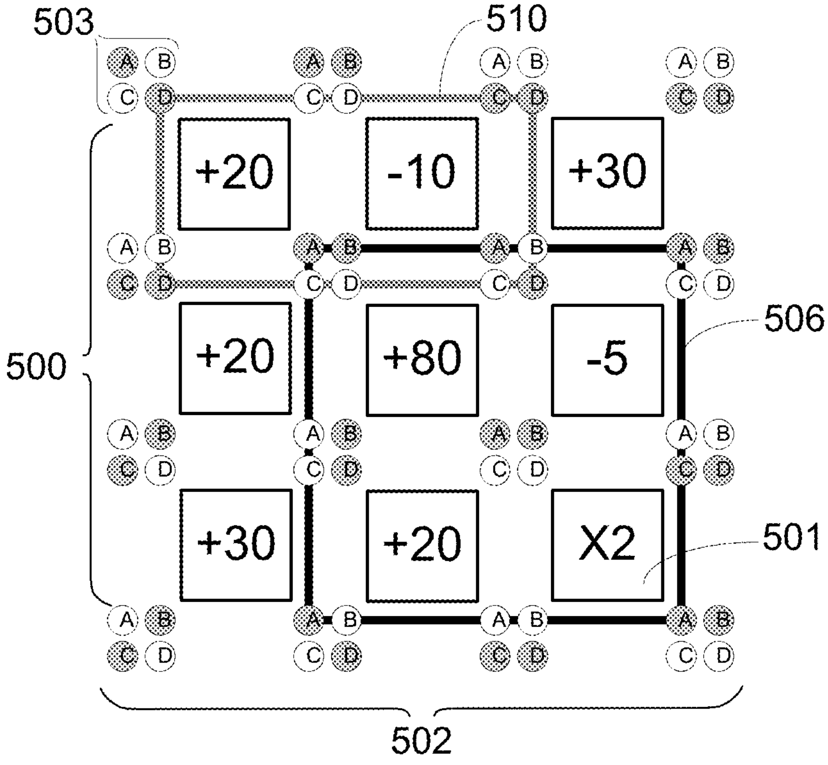

FIG. 5 illustrates an additional embodiment of a gaming activity for portioning a play area in accordance with the invention. FIG. 5 includes a second element grid 502 composed of element sets, such as element set 503. Each element set is composed of four elements, one element labeled “A”, one element labeled “B”, one element labeled “C”, and one element labeled “D”. Two of the elements of each element set are marked. For example, the “A” and “D” elements from element set 503 are marked while the “B” and “C” elements from the same element set are not marked. Although two elements from each element set are marked, in various other embodiments of the invention, zero, one, three or all of the elements from an element set can be marked, and the number of elements marked in each element set need not be consistent.

The elements from element set 503, as well as the other elements of the other element sets of FIG. 5, are each distinguished from each other by a letter label. Elements of element sets can also be distinguished from each other by other labels, words, numbers, shapes, sizes, colors, relative positions and the like.

From the marked element sets of FIG. 5, two subportions have been defined, each defined by correspondingly marked elements, the subportion boundary having a correspondingly marked element at each corner of the subportion boundary. One of the subportions is within a light subportion boundary 510. At each of the corners of the light subportion boundary 510 is a corresponding element of an element set, each corresponding element labeled with a “D” and being darkened (marked). These light subportion boundary 510 corner elements correspond because each is labeled with a “D” and marked. According to the particular embodiment of FIG. 5, elements must be labeled with identical letter markings in order to correspond to one another. However, various embodiments of the invention are not so limited and elements labeled differently can still correspond to one another.

FIG. 5 also includes a dark subportion boundary 506 with a marked element labeled "A" at each corner. One of the subportions of FIG. 5 is within the dark subportion boundary 506. The dark subportion boundary 506 corner elements correspond because each is labeled with an "A" and marked.

The embodiment of FIG. 5 also includes a first element grid 500 overlaid the second element grid 502. The first element grid 500 is comprised of square elements, such as element 501. Each of the square elements of the first element grid 500 are marked with a mathematical function and a value. The mathematical function markings include an addition marking "+", a subtraction marking "–", and a multiplication marking "×".

According to the particular embodiment of FIG. 5, the square elements of the first element grid 500 that are within subportion boundaries 510 and 506 of the second element grid 502 are combined, such that their respective mathematical functions are executed on the values. For example, two square elements are within light subportion boundary 510, one element marked +20 and the other element marked –10. In calculating a payout for the light subportion boundary 510, a value of 20 would first be added and then a value of 10 subtracted. In this way, the elements of the light subportion boundary 510 would contribute a value of 10 toward a payout. There are four elements within the dark subportion boundary 506. The payout associated with the dark subportion boundary adds 80 and 20, subtracts 5, and then multiples the subtotal total by 2 for a payout of 190 ([80+20–5]*2=190). Various other methods of subportion formation and payout determination are contemplated within the scope of this invention and will be realized by one of ordinary skill in the art upon reading this disclosure.

In some embodiments using multiple types of second grid markings, such that demonstrated in FIG. 5, different subportions can be formed depending on the types of markings used to form the subportion. For example, if a first subportion is formed by "A" markings, as with the subportion defined by the light subportion boundary 510, then different rules for applying bonuses and/or evaluating winning combinations of markings can be used for this subportion as compared to subportions formed from the B, C, or D markings types. In some embodiments, a ×4 multiplier bonus may be applied to all winning combinations of markings formed in association with an A-type subportion while a ×3 multiplier bonus may be applied to all winning combinations of markings formed in association with an B-type subportion, a ×2 multiplier bonus may be applied to all winning combinations of markings formed in association with an C-type subportion, and one or more wild elements or other type of bonus is applied to one or more elements within the D-type subportion. In this way, different bonuses can be applied depending on the type of marking used to form the subportion.

In some embodiments, different evaluation standards for recognizing wins are used for different subportions formed from different types of markings of a secondary element grid. For example, if the first element grid 500 was populated by symbols which can be combined in various manners to form winning combinations, such as 3 cherry symbol markings in a scatter or adjacent arrangement, then different rules for recognizing combinations can be applied for the different subportion types. For example, more favorable scatter pay rules may be used for markings within an A-type subportion while less favorable element adjacency rules may be used for markings within a B-type subportion.

Figure 6:
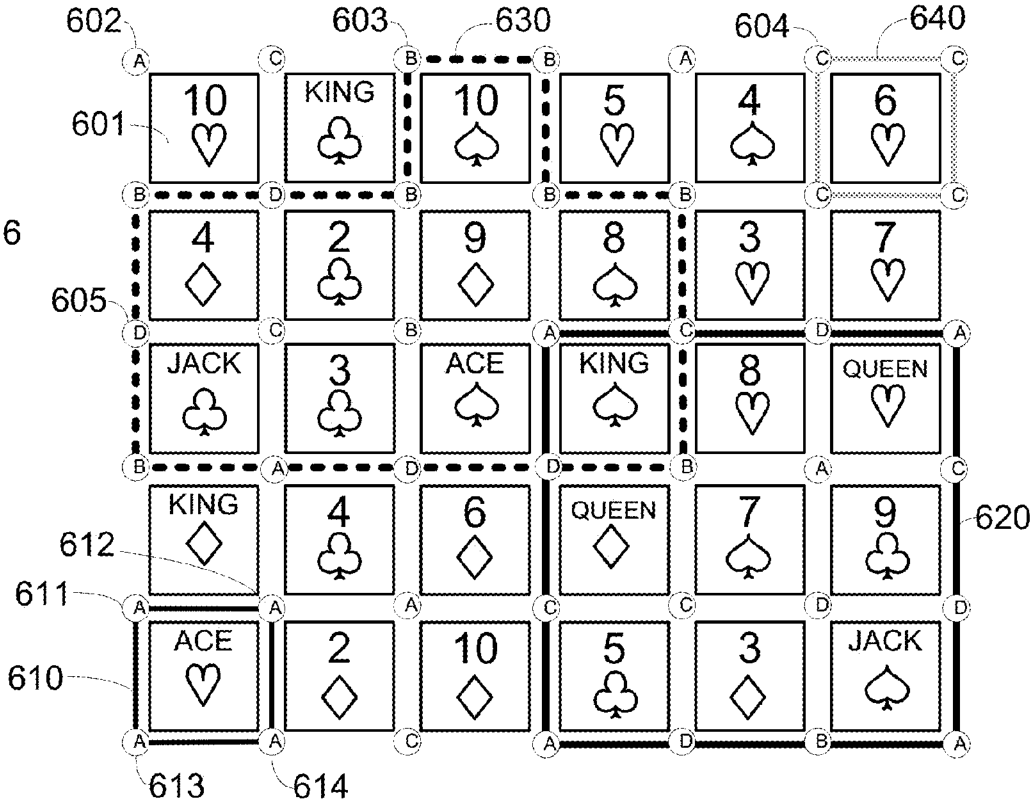

FIG. 6 illustrates an additional embodiment of a gaming activity for portioning a play area in accordance with the invention. FIG. 6 includes circular elements, such as element 602, and square elements, such as element 601, arranged in a grid pattern. Each of the circular elements is marked with an "A", "B", "C", or "D" letter marking. For example, element 602 is marked with an "A", element 603 is marked with a "B", element 604 is marked with a "C", and element 605 is marked with a "D". Each of the square elements is marked to represent a particular card from a traditional deck of cards. For example, element 601 is marked as the 10 of hearts.

The grid of FIG. 6 has been portioned to include subportions within subportion boundaries. In the particular embodiment of FIG. 6, subportions boundaries are formed from straight lines drawn between corresponding circular elements at each corner of the subportion boundary to enclose an area, the lines not overlapping the square elements so as to follow a horizontal and vertical grid pattern. One subportion is within subportion boundary 610, which is formed by straight lines drawn between corresponding circular elements 611, 612, 613, and 614 at each corner of the subportion boundary 610. Being that FIG. 6, like the other embodiments described herein, is presented to demonstrate some of the many gaming aspects contemplated herein, the grid of square elements can use or swap features described elsewhere herein for first element grids and the circular elements can use or swap features described elsewhere herein for second elements grids, among other aspects and features.

FIG. 6 includes four subportions, one subportion within subportion boundary 610, one subportion within subportion boundary 620, one subportion within subportion boundary 630 and one subportion within subportion boundary 640. Subportion boundary 620 is formed from corresponding circular elements, each corresponding circular element marked with an "A". Subportion boundary 630 is formed from corresponding circular elements, each corresponding circular element marked with a "B". Subportion boundary 640 is formed from corresponding circular elements, each corresponding circular element marked with a "C".

Within each of the subportion boundaries 610, 620, 630 and 640 are one or more square elements. The markings of the square elements within subportion boundaries can be used in various different ways to determine when a player has won. For example, the markings of square elements within any of the subportion boundaries 610, 620, 630 and 640 may be used to form a poker hand, the poker hand being the best poker hand possible with the cards in the subportions. Alternatively, multiple poker hands may be formed. For example, a poker hand could be formed from the cards within all subportion boundaries formed from circular elements marked with "A's", which would include the cards represented by all square elements within subportion boundaries 610 and 620. In some embodiments of the invention, one hand is formed by the cards represented by the square elements within all subportion boundaries formed by circular elements marked with an "A". Another hand could be formed by the cards represented by all of the square elements within all subportion boundaries formed by circular elements marked with a "B". Another hand could be formed by the cards represented by the square elements within all subportion boundaries formed by circular elements marked with a "C". No hand could be formed that is associated with a subportion boundary formed by circular elements marked with a "D" because no such subportion boundary exists or could be formed from the particular embodiment of FIG. 6. However, such a subportion boundary formed from elements marked with a "D" could be possible once the elements are remarked/repopulated in a subsequent game.

Various embodiments of the invention can use conventional poker strength-of-hand hierarchies. In order to win and trigger a payout a player may need to form a hand better than a predetermined standard, such as a pair of jacks. Alternatively, a player may need to form a hand that beats another hand likewise formed. For example, a player's hand may be formed from cards represented by square elements within a subportion boundary formed by circular elements marked with an "A" that is better than a hand formed from cards represented by square elements within a subportion boundary formed by circular elements marked with a "B". In some embodiments of the invention, multiple players could play, each player receiving the chance to form a subportion and a poker hand in a way described herein. In some embodiments of the invention, a player may get the chance to form multiple hands from the various different types of subportion portion forming elements, such as three hands, each respectively formed from "A", "B" and "C" marked elements.

Figure 7:
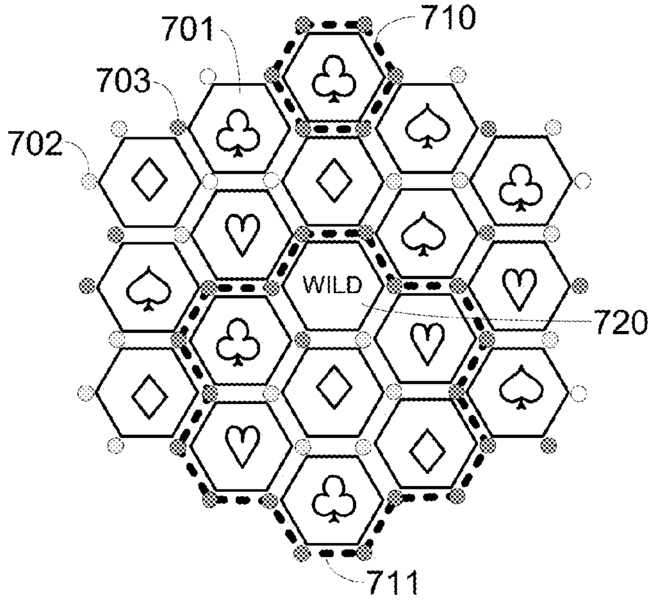

FIG. 7 illustrates an additional embodiment of a gaming activity for portioning a play area in accordance with the invention. The embodiment of FIG. 7 includes a hexagonal element grid composed of hexagonal elements, such as element 701. Each of the hexagonal elements has been marked with a wild, diamond, heart, club or spade symbol.

The embodiment of FIG. 7 also includes a circular element grid composed of circular elements, such as circular elements 702 and 703, overlaid the hexagonal element grid. The circular element grid has been overlaid the hexagonal element grid such that each corner of each hexagonal element is adjacent to a circular element of the circular element grid. Some of the circular elements have been marked, such as element 703, while other circular elements have not been marked, such as element 702.

Subportion boundaries 710 and 711 have been formed in the embodiment of FIG. 7. Each subportion boundary has been formed from lines connecting corresponding circular elements and enclosing at least one element of the hexagonal element grid, the straight lines not overlapping any elements. Within subportion boundary 711 are various marked hexagonal elements. A payout may be issued in various ways for the result illustrated in FIG. 7. For example, the markings of the hexagonal elements within the subportion boundaries 710 and 711 may be analyzed for winning element markings or combinations of element markings that correspond to a paytable. Payouts may be made according to scatter pay or adjacent corresponding element series methods described herein or otherwise known in the art.

The subportion boundary 711 of FIG. 7 illustrates that the possible shapes and configurations of subportion boundaries are virtually limitless and are not limited to four sided shapes but could include triangles or N-gons (polygons of N sides, where N is a whole number greater than 3).

Various embodiments of the invention including marking elements such that the elements become wild elements or otherwise presenting one or more wild elements, such as element 720 of FIG. 7. In some embodiments of the invention, wild elements are capable of corresponding to any other elements, including a plurality of different markings simultaneously, for either or both of forming subportions or triggering payouts. An element could become a wild element because it was marked as such, or the wild element could be located in the grid or array before other elements are located and/or marked. Wild elements could be randomly located or could be located at planned positions.

As one or ordinary skill in the art will understand upon reading this disclosure, the addition of wild elements increases the chances of forming subportions and winning combinations. The use of wild elements can be used to control the odds of a player winning and/or enhance the thrill of game play.

Various embodiments of the invention including marking elements such that the elements become null elements or otherwise presenting one or more null elements. In various embodiments of the disclosure, null elements contain symbols, or alternatively lack symbols, which prevents the elements from corresponding with other elements. For example, in some embodiments of the invention, null elements may not be used to form combinations that trigger payouts. In some embodiments of the invention, null elements may not be used to form subportions.

As one or ordinary skill in the art will understand upon reading this disclosure, the addition of null elements diminishes the chances of forming subportions and winning combinations. The use of null elements can be used to control the odds of a player winning and/or enhance the thrill of game play.

In various embodiments, those elements of a first grid that are activated based on being within a subportion defined by elements of a second grid apply a bonus to wins associated with the activated elements, while wins identified outside of the subportion are recognized and paid but no bonus is applied to make win formation more likely or to augment the payout, as with the activated elements/portions. In some embodiments, a side bet is made or premium is paid by the player for the enhanced functionality of a subportion. For example, without the side bet or premium, winning combinations within a play area are recognized and paid, but odds are not adjusted or other bonus is not applied. When the side bet is placed or the premium is paid by the player, then bonus functionality associated with formation of a subportion by elements of a second grid, as described elsewhere therein, can then be applied.

In some embodiments, certain element markings of a first grid only have functionality, or bonus functionality, when they are within a subportion. For example, in FIG. 7, all elements and markings of the first grid may be evaluated for wins (e.g., 5 element combinations having corresponding marking), but the wild functionality of element 720 may only be triggered if that elements is activated by being within a subportion. As such, some elements and markings of a first grid may have one function, or no function, when outside of a subportion, and have a second different function when activated inside of a subportion. These dual functionality elements and symbols may be, in some embodiments, limited to bonus type elements and markings, such a wild and multiplier markings.

Non-activated elements of a first grid (i.e. those outside of a subportion) may still be evaluated for winning element formation in some embodiments, but activation indicates that some benefit is accorded activated elements or wins associated with activated elements/portions that is not accorded non-activated elements or wins unassociated with activated elements/portions.

Figure 8:
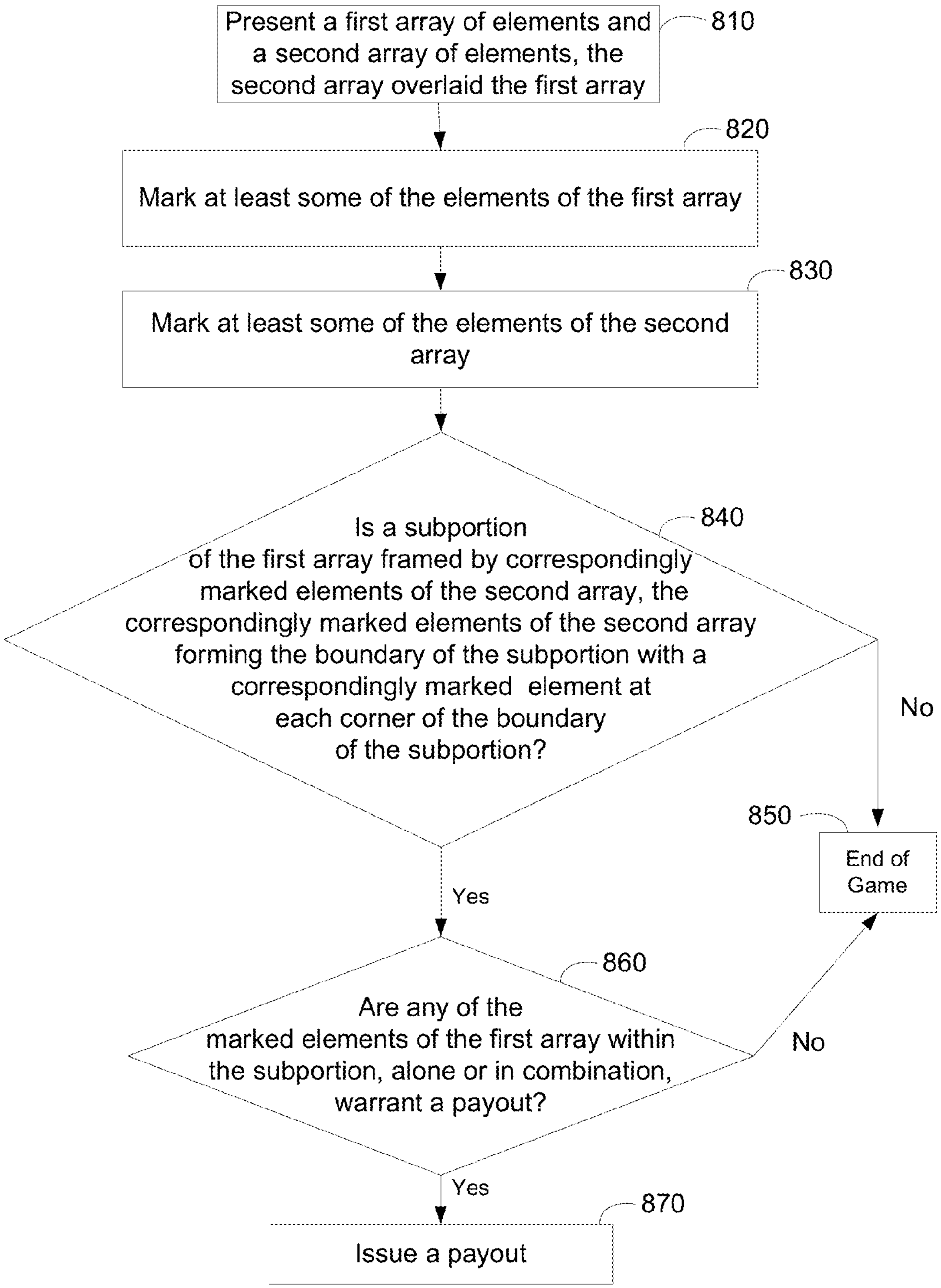
FIG. 8 is another flow diagram of an exemplary embodiment of a method for portioning a play area in accordance with aspects of the invention.

FIG. 8 is another flow diagram of an exemplary embodiment of a method for portioning a gaming play area in accordance with the invention. The method of FIG. 8 includes presenting 810 a first array of elements and a second array of elements overlaid the first array. A grid or play area can be presented in the same way as an array and can operate for the same purposes according to the current invention. In some embodiments of the invention, a single array composed of at least two different types of elements is presented instead of two different overlaid arrays.

The method of FIG. 8 further includes marking 820 at least some of the elements of the first array. The method of FIG. 8 also includes marking 830 at least some of the elements of the second array. Marking of the elements may be done in any way herein described or otherwise known in the art. The steps of 820 and 830 can be done in any order, including simultaneously, as the scope of the invention is not limited to the steps and/or ordering of the steps illustrated in the flow chart of FIG. 8. For example, the marking of elements of one array may be dependent on the number of elements contained within a subportion formed by correspondingly marked elements, and as such elements of the subportion forming array must first be marked.

The method of FIG. 8 further includes evaluating whether a subportion of the first array is framed by correspondingly marked elements of the second array, the correspondingly marked elements of the second array forming the boundary of the subportion with a correspondingly marked element at each corner of the boundary of the subportion 840. The subportion boundary may be formed by lines connecting corresponding elements of the second array and enclosing at least one element of the first array, the lines not intersecting any elements of the first array. Although many embodiments have been described and illustrated herein as using lines between correspondingly marked elements of a second grid, these and other embodiments may not necessary draw lines between the corresponding elements to define a subportion. For example, a subportion may simply be framed by having correspondingly marked elements of a second grid at each corner of the subportion, the corner elements defining the subportion by framing. In various embodiments lines are used as a convenience to illustrate and highlight the subportion, but are not necessary in some embodiments. However, in some embodiments, the use of lines as described herein is considered a part of forming and defining a subportion.

Returning to FIG. 8, if the condition of step 840 is not satisfied then the game is over 850. According to some embodiments of the invention, elements or element combinations can not be activated to trigger a bonus feature, be winning elements, or winning element combinations if they are not within a subportion. Accordingly, the game ends 850 if no subportion can be formed.

The method of FIG. 8 further includes evaluating whether any of the marked elements of the first array within the subportion, alone or in combination, warrant a payout 860. In some embodiments of the invention, a pay table can be used to determine whether a marked element or combination of marked elements warrants a payout. The evaluation performed in step 860 can be performed by a processor executing instructions stored in memory and/or manually by a person.

A pay table contains criteria for issuing payouts and information about the payouts. Different elements and element combinations can be listed in a pay table, along with an associated payout amount. Pay tables can also include information and criteria for evaluating and applying bonuses, such as multipliers and additional plays.

According to the method of FIG. 8, if there are no winning element combinations within the subportion according to a pay table, then the game is ended 850. However, if a winning element combination, according to a pay table, is located within the subportion then a payout is issued 870 for this winning combination. The payout may be issued according to an amount associated with the winning combination in the pay table. The making of the payout may be delayed by the user, by operation of the game or by another game. For example, a bonus game may be played after the game embodied in the flow chart of FIG. 8 is completed, where the payout is put at stake in another game.

Figure 9:
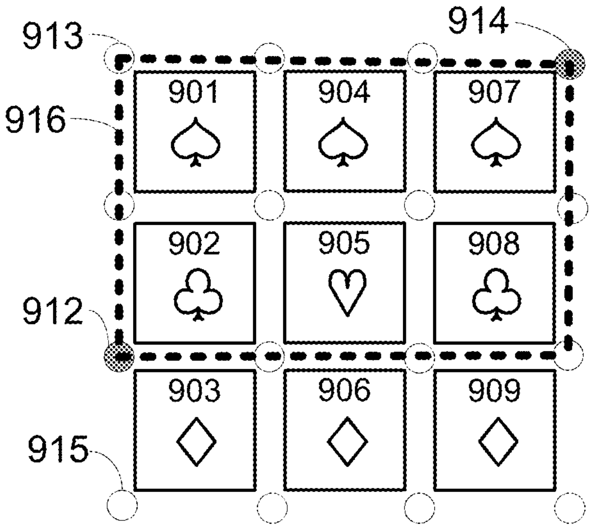
FIG. 9 illustrates another embodiment of a gaming activity for portioning a play area in accordance with aspects of the invention.

FIG. 9 illustrates an additional embodiment of a gaming activity for portioning a play area. FIG. 9 illustrates a first grid of elements 901-909 along which is arranged a second grid of elements. The elements of the second grid are shown as circles, such as second grid elements 912-915. The elements of the second grid are arranged in the corners between the elements of the first grid. All elements of the first grid have been marked in an earlier stage of game play. For example, element 901 was marked with a spade symbol of a card game while element 902 was marked with a club symbol. These element markings could be selected according to any technique referenced herein, including by random selection for each element. The first grid of elements 901-909 can be a conventional 3×3 grid of elements, such as a grid made by spinning reels.

Some elements of the second grid have also been marked, such as elements 912 and 914. The marking of secondary grid elements occurs in the embodiment of FIG. 9, as in some other embodiments of the present disclosure, by being shaded to represent marking. Not all elements are highlighted, such as element 915, and accordingly these elements have not been marked.

According to the particular rules of the embodiment of FIG. 9, a play area is portioned by corner elements of the secondary grid being marked to define the frame corners of a four sided shape, those first grid elements within the subportion being activated by being within the subportion. Dashed line 916 illustrates the portioned play area boundary formed by elements 912 and 914 defining opposite corners of the portioned area. While various other embodiments require that a marked element define each corner of a subportion, embodiments such as that of FIG. 9 form play areas based on two marked elements of a particular grid and what kind of square or rectangle shape can be fit to these two marked elements such that the marked elements define opposite corners of the square or rectangle. Such rules allow for easier formation of subportions, as a fewer number of marked elements are needed to form a subportion relative to embodiments requiring that correspondingly marked elements define each corner of a subportion. However, the shapes that can be formed by embodiments using subportion formation rules similar to that of FIG. 9 are limited in the variety of shapes that can be formed. For example, an "L" shaped subportion could be formed using the rules of the embodiment of FIG. 6, while square and rectangle shapes would be formed by the particular embodiment of FIG. 9 using opposite corner subportion formation definitions.

FIG. 9 also illustrates gaming aspects that can be used in the other embodiments referenced herein. For example, all elements 901-909 of the first grid may be evaluated for winning combinations, while particular bonuses are given for winning combinations entirely and/or partially in a subportion. In such a case, a payout could be triggered by the three diamond symbols of elements 903, 906, and 909, but this payout is not enhanced by a bonus because elements 903, 906, and 909 are not activated for the bonus by virtue of being outside of a subportion. The combination of elements 901, 904, and 907, all marked with spades symbols, may also trigger a payout. Furthermore, the payout associated with elements 901, 904, and 907 may be enhanced by a multiplier, added amount, or some other bonus because these elements form a corresponding combination of marked elements within a subportion and are therefore activated to receive the bonus.

In some embodiments, only those elements within a subportion, such as the subportion defined by dashed line boundary 916, will be evaluated to identify winning combinations of corresponding elements. Under such rules, elements 901, 904, and 907 may trigger a payout by virtue of these elements forming an adjacent set of correspondingly marked elements, but elements 903, 906, and 909 would not trigger a payout even though these elements also form an adjacent set of correspondingly marked elements.

In some embodiments, the number of elements of a primary grid within a subportion is used to calculate a bonus, such as a multiplier bonus. For example, if 3 elements of a primary grid are within a subportion created by any technique described herein and therefore activated to receive a bonus, then a multiplier bonus of 3 is applied to a winning combination, the winning combination occurring anywhere in the play area (not necessarily within the subportion). If such rules were applied to the embodiment of FIG. 9, then a 6× multiplier would be applied to the payout associated with elements 901, 904, and 907 and/or elements 903, 906, and 909, where the multiplier can be applied to the highest payout, lowest payout, player selected payout, or randomly selected payout, for example. In some embodiments, such a multiplier is only used to augment payouts of a particular line, line wins in general, scatter payouts (within or outside of the subportion), or line wins intersecting with the subportion associated with the bonus. Such features and concepts can be selectively applied to the other embodiments referenced herein.

Some embodiments can apply different bonuses depending on the quantity of elements of a first grid within a subportion created by elements of a second grid regardless of how marked. In some embodiments, larger subportions with a greater amount of first grid elements will trigger a first type of bonus while smaller subportions with a lesser amount of first grid elements will trigger a second type of bonus. For example, an embodiment may have a threshold of 5 first grid elements, where subportions containing 5 or more first grid elements will trigger a different bonus than that triggered by a subportion having 4 or fewer first grid elements. Any subportion containing 5 or more first grid elements may trigger use of a multiplier while the subportion containing 4 or fewer elements enable one or more of these elements with wild functionality. In some embodiments, smaller subportions provide bonuses while larger subportions provide lesser or no bonuses. In some embodiments, a larger bonus (or the only bonus) is applied to subportions below a threshold number of elements in size in recognition of the greater difficulty of forming winning combinations of markings in the fewer elements of these smaller subportions. In various embodiments, only 1×1 element dimension first grid subportions trigger a bonus, such as conversion to wilds, while larger subportions have no effect. In these ways, the type of bonus associated with a subportion can be contingent on the size of the subportion. Such features can concepts can be selectively applied to the other embodiments referenced herein.

Figure 10:
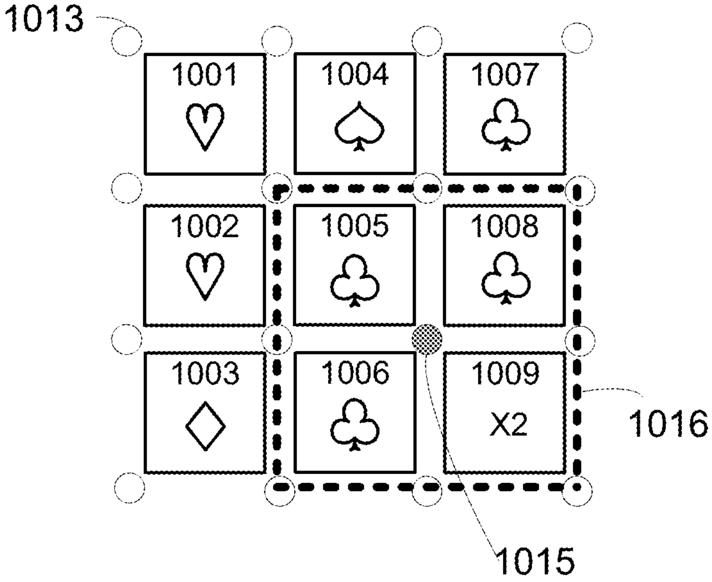
FIG. 10 illustrates another embodiment of a gaming activity for portioning a play area in accordance with aspects of the invention.

FIG. 10 illustrates an additional embodiment of a gaming activity for portioning a play area. FIG. 10 illustrates a first grid of elements 1001-1009 over which is laid a second grid of elements. The elements of the second grid are shown as circles, such as second grid elements 1012-1015. The elements of the second grid are arranged in the corners between the elements of the first grid.

Element 1015 of the secondary grid has been marked in a process of randomly marking elements of a grid as described elsewhere herein. According to the particular rules of the embodiment of FIG. 10, a play area is portioned by defining the subportion as those elements of the first grid that are proximate a marked element of the secondary grid. Proximity in this embodiment is defined as those elements of the first grid that are adjacent to a highlighted element of the secondary grid. Therefore, dashed line boundary 1016 is illustrated to show that elements 1005, 1006, 1008, and 1009 form a subportion. If element 1013 of the second grid had been marked, then element 1001 of the first grid would also be within a subportion, as elements 1001 and 1013 are proximate are proximate one another. In such a case, element 1001 may be treated as being in its own subportion or may be evaluated along with the elements of other subportions, according to the particular rules applied.

The elements of a subportion in FIG. 10 can be evaluated in any manner of the other embodiments referenced herein. For example, the elements within the dashed line boundary 1016 could be evaluated according to scatter pay rules. Therefore, elements 1005, 1006, and 1008 could trigger a payout according to a paytable for each being marked with a club symbol (where the paytable may require a minimum number of three correspondingly marked elements in a play area, for example) and this payout may be doubled based on the ×2 multiplier of element 1009 also within the subportion.

While a subportion can be defined as those elements of a primary grid that are proximate via adjacency to a marked element of a secondary grid, various other embodiments are not so limited. For example in some embodiments, a subportion can be defined as those elements of a primary grid that touch a marked element of a secondary grid, such as if element 1015 of the second grid were enlarged to overlap with elements 1005, 1006, 1008, and 1009. In some embodiments, a subportion can be defined as those elements of a primary grid that surround a marked element of a secondary grid.

In various embodiments, the bonus associated with the creation of a subportion is remarking (e.g., respinning) of the elements activated by being within the subportion. Alternatively, all elements within the subportion can remain while first grid elements outside the subportion can be remarked. In either case, various conditions can be included with remarking embodiments. In some embodiments, a first marking evaluation is performed before remarking, and a second marking evaluation is performed after the remarking, thereby providing two chances to form winning combinations. In some embodiments, all elements of the first grid are evaluated for the second evaluation after remarking, however in some other embodiments only those elements remarked are evaluated the second time. In some embodiments only one evaluation is performed, such as after the remarking. In some embodiments, an evaluation is done for all elements after each element within a subportion is remarked, such that three elements in a subportion could trigger four evaluations (one before the first remarking and an additional evaluation for each of the three remarkings). Increased number of evaluations after element markings have changed, such as by adding a wild or otherwise remarking, increase the odds of issuing a payout.

In some embodiments, remarking is performed only for those elements within a subportion whose replacement could improve the outcome for a player. For example, replacement markings could be randomly selected for the elements of a subportion, and an evaluation done to determine whether each remarking symbol would improve an outcome or increase the payout odds, and then only mark and apply the randomly selected remarking symbol to each element if the remarking is determined to improve the outcome or odds for a payout. However, in various embodiments, remarking occurs for all elements of a first grid within a subportion created by markings of a second grid.

In some embodiments, remarking does not involve random selection from the same grouping of symbol types that was used to originally populate the elements of a first grid. For example, the selection may come from a second group of elements that have different function as compared to the first group, such as multipliers and wilds and/or markings having some other particular advantageous function beyond that used to originally populate. In some embodiments, the bonus symbols are more likely to be populated to an element during remarking than the original marking process. In some embodiments, a remarking of elements within a subportion involves reshuffling those markings already in the subportion and then reevaluating the whole play area or subportion. The reshuffling moves the same markings to different locations where new combinations of elements might be formed. In some embodiments, all first grid elements of the subportion may be remarked with wilds. In some embodiments, all first grid elements of the subportion may be remarked with blanks (e.g., null symbols) and advantageous symbols (e.g., wilds) and then the whole play area of the first grid reevaluated.

In some embodiments, element markings of the first grid are evaluated for winning combinations differently depending on whether they are in a subportion created by markings of a second grid. The probability of forming winning combinations may be higher for those elements within the subportion as compared to these elements outside of the subportion as a reward for formation of the subportion. For example, markings within the subportion and thereby activated to receive the adjustment in odds could be evaluated according to scatter pay rules while elements outside of the subportion can be evaluated according to adjacency rules, wherein it is easier to forming winning combinations of markings in a scatter arrangement then in an adjacent arrangement. In various embodiments, a single combination of markings of elements of a first grid can straddle a subportion boundary, where the elements outside of the subportion must be in some adjacent arrangement, and at least one element adjacent to the subportion boundary, while those element markings within the subportion need not be adjacent consistent with the more favorable rules applied within a subportion. In some embodiments, only the highest payout winning marking combination is awarded a payout while lower payout yielding combinations do not actually trigger payouts.

Figure 11A:
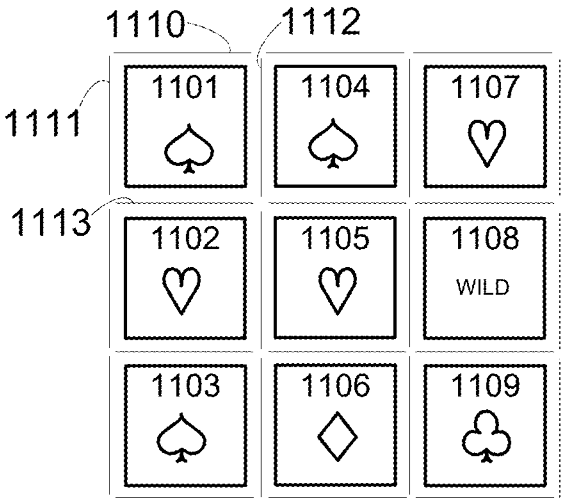
FIGS. 11A-B illustrates another embodiment of a gaming activity for portioning a play area in accordance with aspects of the invention.

FIG. 11A illustrates an additional embodiment of a gaming activity for portioning a play area. FIG. 11A illustrates a first grid of elements 1101-1109 over which is laid a second grid of elements. The elements of the second grid are shown as vertical and horizontal lines between and framing the elements 1101-1109 of the first grid, such as second grid elements 1110-1113. All elements of the first grid have been marked in an earlier stage of game play. For example, element 1101 was marked with a spade symbol of a card game theme while element 1108 was marked with a WILD symbol. The element markings of the first grid could be selected according to any technique referenced herein, including by random selection for each element.

Figure 11B:
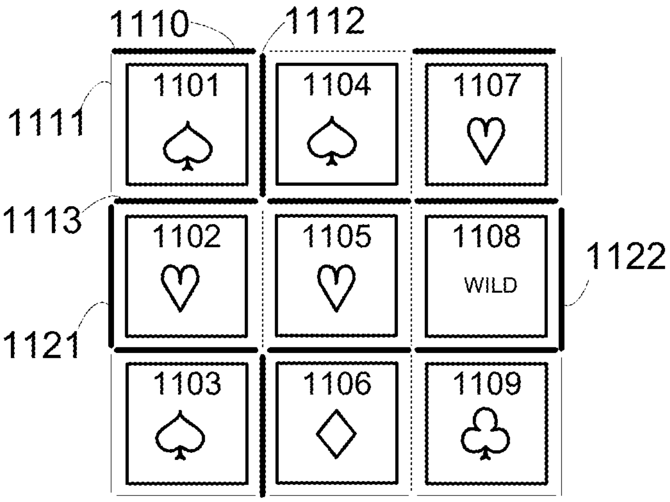

The elements of the second grid are all unmarked in the stage of game play of FIG. 11A. However, these elements can be marked in any manner referenced herein, such as by random selection for each element to be highlighted or not highlighted. FIG. 11B shows a latter stage of game play were some elements of the second grid were marked, shown by a bold line for each marked elements. For example, element 1110 was marked while element 1111 was not, such that element 1110 is illustrated as bold relative to element 1111.

The marked elements of the second grid of the embodiment of FIG. 11B can define subportions when those marked elements enclose an area of the first grid. For example, elements 1102, 1105, and 1108 are within a subportion that is defined by marked elements of the second grid enclosing this subportion. It is noted that enclosure in this sense does not necessarily mean contiguous or uninterrupted surrounding by the lines as graphically displayed, but rather that all spaces for elements of the second grid defining this subportion are highlighted, which activates this subportion. Therefore, while some other embodiments use corner framing elements (second grid elements at the corners of a first grid), the embodiment of FIGS. 11A-B uses side framing elements (second grid elements at the horizontal and vertical sides of a first grid).

Element 1101 is not within a subportion because vertical line element 1111 was not marked. However, had vertical line element 1111 been marked then element 1101 would have been enclosed by marked elements 1110-1113. In this case, element 1101 may have been considered to be within the same subportion as elements 1102, 1105, and 1108 by virtue of being adjacent to this subportion, depending on which particular rules as described elsewhere herein are applied to this embodiment.

According to the particular rules of FIG. 11B, only those elements of an activated portion will be considered for payouts. Therefore, elements 1102, 1105, and 1108, being within the subportion enclosed by elements of the second grid, will be considered for winning combinations that trigger a payout. Depending on the pay table used, the two heart markings and wild markings of elements could trigger a payout. While certain game play rules have been discussed in connection with FIGS. 1-11B, these embodiments are presented as non-limiting examples demonstrating aspects and features of the present invention, as with other embodiments discussed herein. For example, while the embodiment of FIG. 11B was presented with rules whereby only those elements within a subportion are evaluated for payouts, this embodiment is not so limited and the rules of other embodiments could be used, such as where all elements of the primary grid are evaluated for winning combinations while a bonus is applied to those payouts associated with an activated portion of the play area discussed in connection with some other embodiments. Likewise, the other embodiments presented herein are not necessarily limited to the particular features and options presented in connection with these embodiments. The features, options, rules, and the like can be substituted or applied for other embodiments as well, as one having ordinary skill in the art reviewing this disclosure will appreciate that the embodiments are presented to demonstrate the various concepts of the invention and not to outline the sole configurations contemplated.

Figure 12:
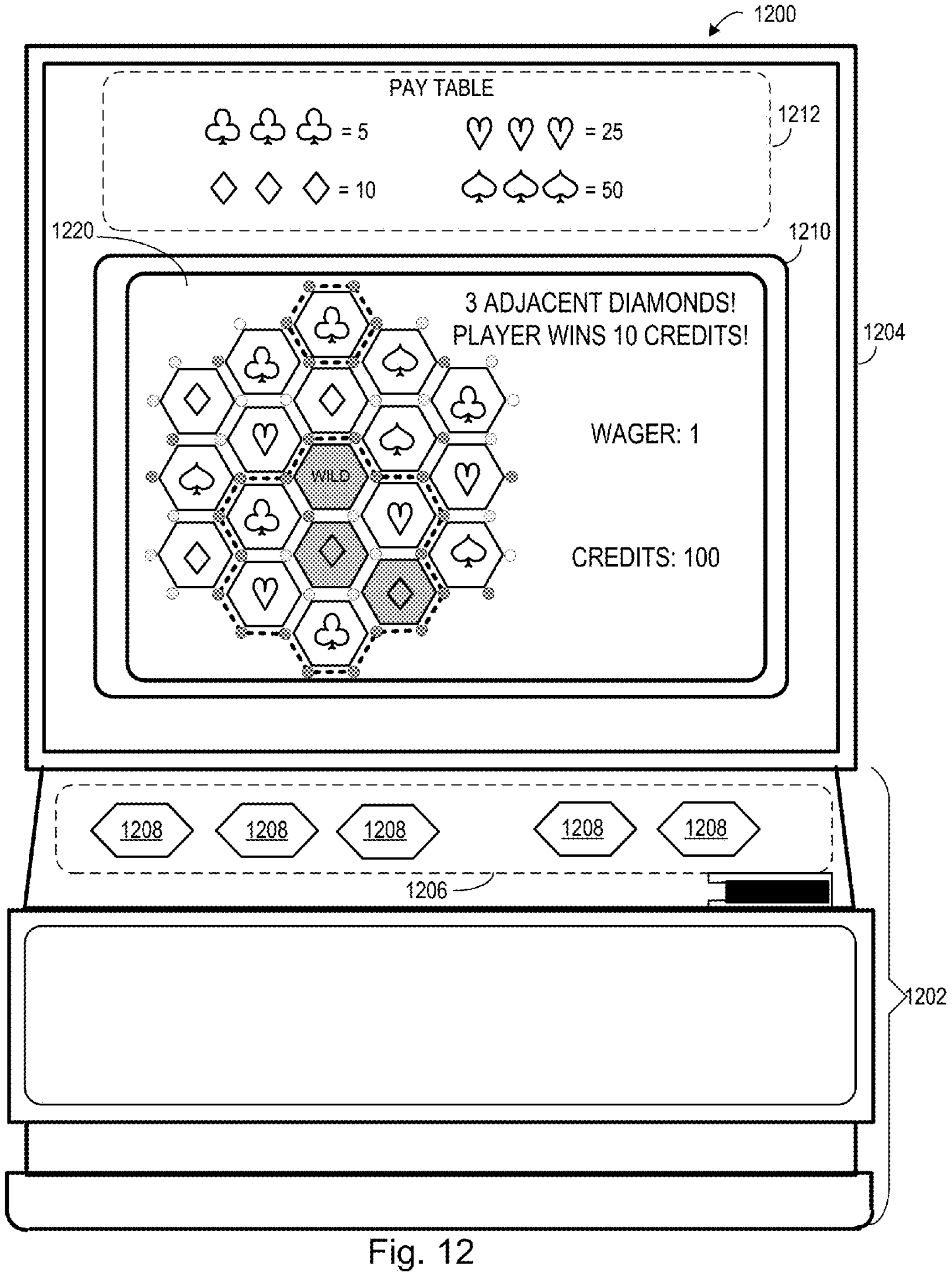
FIG. 12 is an embodiment of a casino-style gaming device in which the principles of the present invention may be applied.

FIG. 12 is an embodiment of a casino-style gaming device in which the principles of the present invention may be applied. The slot machine 1200 is a structure including at least a computing system, a housing, and a display. The housing includes a base 1202 and a display device 1204 to allow the slot machine 1200 to be a self-supported, independent structure. The base 1202 includes structure supporting the slot machine 1200, and also includes a user interface 1206 to allow the user to control and engage in play of the slot machine 1200. The particular user interface mechanisms associated with user interface 1206 is dependent on the type of gaming machine. For example, the user interface 1206 may include one or more buttons, switches, joysticks, levers, pull-down handles, trackballs, voice-activated input, or any other user input system or mechanism that allows the user to participate in the particular gaming activity. The user input 1206 allows the user to enter coins or otherwise obtain credits through vouchers, tokens, credit cards, etc. Various mechanisms for entering such vouchers, tokens, credit cards, coins, point tickets, etc. are known in the art. For example, coin/token input mechanisms, card readers, credit card readers, smart card readers, punch card readers, and other mechanisms may be used to enter wagers. The user input may include a plurality of buttons 1208, which allow the user to initiate the game play in accordance with the invention, enter a number of credits to play, select options, cash out, automatically bet the maximum amount, etc. It should be recognized that a wide variety of other user interface options are available for use in connection with the present invention, including pressing a button on a gaming machine, touching a segment of a touch-screen, entering text, entering voice commands, or other known user entry methodology.

Returning now to FIG. 12, the display device 1204 includes a display screen 1210. The display device may take on a variety of forms depending on what type of presentation is to be provided. For example, a slot game area 1220 is provided where the slot gaming activity in accordance with the invention is displayed. The video display screen may be implemented in a variety of manners, including electronically represented with outputs shown on conventional electronic displays, such as a liquid crystal displays (LCD), dot matrix, plasma, CRT, LED, electro-luminescent display, or generally any type of video display known in the art.

Also associated with the display device 1204 is an optional winning guide area 1212, where information associated with the potential winning elements and combinations may be presented. This area may also provide an indication of the requisite symbols, scatter pays, symbol lengths, symbol combinations, symbol locations, etc. that result in payouts to the participant. This information may be part of the display screen 1210, or alternatively may be separate from the display screen 1210 and provided directly on a portion of the display device 1204 structure itself. For example, a backlit colored panel may be used as the winning guide area 1212. Further, this information may be provided on an entirely separate display screen (not shown).

Figure 13:
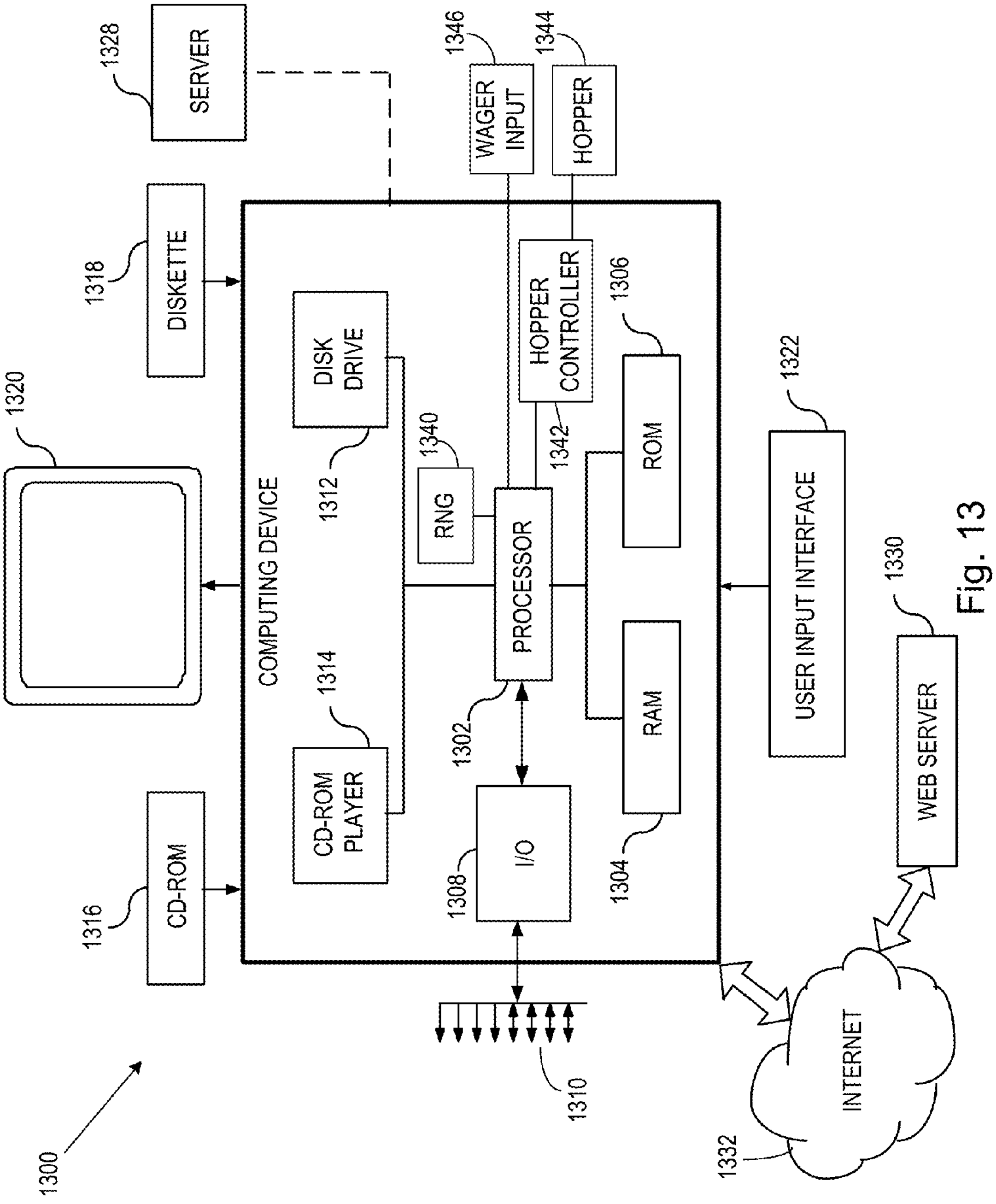
FIG. 13 illustrates a representative computing system capable of carrying out operations in accordance with the invention.

The gaming machines described in connection with the present invention may be independent casino gaming machines, such as slot machines or other special purpose gaming kiosks, video games, or may be computing systems operating under the direction of local gaming software and/or remotely-provided software such as provided by an application service provider (ASP). The casino gaming machines utilize computing systems to control and manage the gaming activity. An example of a representative computing system capable of carrying out operations in accordance with the invention is illustrated in FIG. 13.

Hardware, firmware, software or a combination thereof may be used to perform the various gaming functions, display presentations and operations described herein. The functional modules used in connection with the invention may reside in a gaming machine as described, or may alternatively reside on a stand-alone or networked computer. The computing structure 1300 of FIG. 13 is an example computing structure that can be used in connection with such electronic gaming machines, computers, or other computer-implemented devices to carry out operations of the present invention.

The example computing arrangement 1300 suitable for performing the gaming activity for portioning a play area in accordance with the present invention typically includes a central processor (CPU) 1302 coupled to random access memory (RAM) 1304 and some variation of read-only memory (ROM) 1306. The ROM 1306 may also be other types of storage media to store programs, such as programmable ROM (PROM), erasable PROM (EPROM), etc. The processor 1302 may communicate with other internal and external components through input/output (I/O) circuitry 1308 and bussing 1310, to provide control signals, communication signals, and the like.

Chance-based gaming systems such as slot machines, in which the present invention is applicable, are governed by random numbers and processors. Electronic reels are used to display the result of the digital reels which are actually stored in computer memory and "spun" by a random number generator (RNG). RNGs are well-known in the art, and may be implemented using hardware, software operable in connection with the processor 1302, or some combination of hardware and software. In accordance with generally known technology in the field of slot machines, the processor 1302 associated with the slot machine, under appropriate program instruction, can simulate the vertical rotation of multiple reels. Generally, the RNG continuously cycles through numbers, even when the machine is not being played. The slot machine selects, for example, three random numbers. The numbers chosen at the moment the play is initiated are typically the numbers used to determine the final outcome, i.e., the outcome is settled the moment the reels are spun. The resulting random numbers are generally divided by a fixed number. This fixed number is often thirty-two, but for slot machines with large progressive jackpots it may be even greater. After dividing, the remainders will be retained. For example, if the divisor was one-hundred twenty-eight, the machine would have three remainders ranging from zero to one-hundred twenty-seven. The remainders may be considered as stops on virtual reels. If the divisor was one-hundred twenty-eight, then the virtual reels would each have one-hundred twenty-eight stops with each stop being equally likely. Each stop on the virtual reel may be mapped to a stop on an actual reel or displayed reel image. These reel images may then be displayed on the display 1320. The present invention is operable using any known RNG, and may be integrally programmed as part of the processor 1302 operation, or alternatively may be a separate RNG controller 1340. RNGs are well known in the art, and any type of RNG may be implemented for the standard mode of play and/or the bonus mode of play in accordance with the invention.

The computing arrangement 1300 may also include one or more data storage devices, including hard and floppy disk drives 1312, CD-ROM drives 1314, and other hardware capable of reading and/or storing information such as DVD, etc. In one embodiment, software for carrying out the gaming operations in accordance with the present invention may be stored and distributed on a CD-ROM 1316, diskette 1318 or other form of media capable of portably storing information. These storage media may be inserted into, and read by, devices such as the CD-ROM drive 1314, the disk drive 1312, etc. The software may also be transmitted to the computing arrangement 1300 via data signals, such as being downloaded electronically via a network, such as the Internet. Further, as previously described, the software for carrying out the functions associated with the present invention may alternatively be stored in internal memory/storage of the computing device 1300, such as in the ROM 1306. The computing arrangement 1300 is coupled to the display 1320, which represents a display on which the gaming activities in accordance with the invention are presented. The display 1320 merely represents the "presentation" of the video information in accordance with the invention, and may be any type of known display or presentation screen, such as LCD displays, plasma display, cathode ray tubes (CRT), etc. Where the computing device 1300 represents a stand-alone or networked computer, the display 1320 may represent a standard computer terminal or display capable of displaying multiple windows, frames, etc. Where the computing device is embedded within an electronic gaming machine, such as slot machine 1300 of FIG. 13, the display 1320 corresponds to the display screen 1310 of FIG. 13. A user input interface 1322 such as a mouse or keyboard may be provided where the computing device 1300 is associated with a standard computer. An embodiment of a user input interface 1322 is illustrated in connection with an electronic gaming machine 1300 of FIG. 13 as the various "buttons" 1308. Other user input interface devices include a keyboard, a mouse, a microphone, a touch pad, a touch screen, voice-recognition system, etc.

In various embodiments of the invention, various aspects of the game, as described herein, may be player controlled. For example, a play may place bets, select game types, select play area types, select play area types, select themes, select symbols, select colors, select elements, and/or select sub-portions.

The computing arrangement 1300 may be connected to other computing devices or gaming machines, such as via a network. The computing arrangement 1300 may be connected to a network server 1328 in an intranet or local network configuration. The computer may further be part of a larger network configuration as in a global area network (GAN) such as the Internet. In such a case, the computer accesses one or more web servers 1330 via the Internet 1332.

Other components directed to slot machine implementations include manners of gaming participant payment, and gaming machine payout. For example, a slot machine including the computing arrangement 1300 may also include a hopper controller 1342 to determine the amount of payout to be provided to the participant. The hopper controller may be integrally implemented with the processor 1302, or alternatively as a separate hopper controller 1342. A hopper 1344 may also be provided in slot machine embodiments, where the hopper serves as the mechanism holding the coins/tokens of the machine. The wager input module 1346 represents any mechanism for accepting coins, tokens, coupons, bills, credit cards, smart cards, membership cards, etc. for which a participant inputs a wager amount.

Using the foregoing specification, the invention may be implemented as a machine, process, or article of manufacture by using standard programming and/or engineering techniques to produce programming software, firmware, hardware or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

One skilled in the art of computer science from the description provided herein will be able to combine the software created as described with appropriate general purpose or special purpose computer hardware to create a computer system and/or computer subcomponents embodying the invention, and to create a computer system and/or computer subcomponents for carrying out methods of the invention.

The invention claimed is:

1. A wagering gaming device comprising:

a display device configured to display:

a first grid of a plurality of symbol display positions; and a second grid of a plurality of boundary elements, the plurality of boundary elements positioned at least between some of the plurality of symbol display positions of the first grid;

a wager input device configured to receive currency or currency based tickets, the currency or currency based tickets establishing a credit balance, the credit balance being increasable and decreasable based at least on wagering activity;

a cashout device configured to receive an input to cause an initiation of a payout associated with the credit balance;

a memory device configured to store data related to a plurality of game reels, the data including arrangements of symbols associated with each of the game reels; and game circuitry configured to:

receive a wager signal to initiate a game of chance in response to placement of a wager, the wager decreasing the credit balance;

mark one or more of the plurality of symbol display positions of the first grid by spinning a first plurality of the game reels and stopping the first plurality of game reels to display symbols in the symbol display positions;

mark one or more of the plurality of boundary elements of the second grid, the boundary elements being marked independently of the symbols displayed in the first grid;

frame at least a portion of the first grid by using at least some of the marked boundary elements of the second grid to define a subportion frame, the subportion frame enclosing at least one symbol display position of the first grid;

re-mark the at least one symbol display position of the first grid enclosed in the subportion frame;

evaluate symbol combinations formed from the symbols displayed in the symbol positions of the first grid for awards after re-marking the at least one symbol display position of the first grid enclosed in the subportion frame, the awards increasing the credit balance; and detect the input to cause the initiation of the payout, via the cashout device.

2. The wagering gaming device of claim 1, wherein re-marking the at least one symbol display position of the first grid enclosed in the subportion frame includes spinning the first plurality of game reels within the subportion frame to display at least one new symbol in the respective at least one symbol display portion enclosed in the subportion frame.

3. The wagering gaming device of claim 2, wherein the game reels spun during the re-marking of the at least one symbol display position are independent game reels spinning only within the respective symbol positions in the at least one symbol display position being re-marked.

4. The wagering gaming device of claim 1, wherein re-marking the at least one symbol display position of the first grid enclosed in the subportion frame includes:

providing a second plurality of game reels; and spinning the second plurality of game reels within the subportion frame to display at least one new symbol in the respective at least one symbol display portion enclosed in the subportion frame.

5. The wagering gaming device of claim 4, wherein providing the second plurality of game reels includes using predefined new game reels.

6. The wagering gaming device of claim 4, wherein providing the second plurality of game reels includes modifying the first plurality of game reels.

7. The wagering gaming device of claim 6, wherein modifying the first plurality of game reels includes adding wild symbols to at least one of the first plurality of game reels.

8. The wagering gaming device of claim 6, wherein modifying the first plurality of game reels includes adding bonus symbols to at least one of the first plurality of game reels.

9. The wagering gaming device of claim 6, wherein modifying the first plurality of game reels includes adding multiplier symbols to at least one of the first plurality of game reels.

10. The wagering gaming device of claim 1, wherein the game circuitry is further configured to evaluate symbol combinations formed from the symbols displayed in the symbol positions of the first grid for awards before re-marking the at least one symbol display position of the first grid enclosed in the subportion frame.

11. A wagering gaming device comprising:

a display device configured to display:

a first grid of a plurality of symbol display positions; and a second grid of a plurality of boundary elements, the plurality of boundary elements positioned at least between some of the plurality of symbol display positions of the first grid;

a wager input device configured to receive currency or currency based tickets, the currency or currency based tickets establishing a credit balance, the credit balance being increasable and decreasable based at least on wagering activity;

a cashout device configured to receive an input to cause an initiation of a payout associated with the credit balance;

a memory device configured to store the credit balance and a plurality of symbols; and game circuitry configured to:

receive a wager signal to initiate a game of chance in response to placement of a wager, the wager decreasing the credit balance;

mark one or more of the plurality of symbol display positions of the first grid by randomly selecting symbols to appear on the plurality of symbol display positions;

mark one or more of the plurality of boundary elements of the second grid, the boundary elements being marked independently of the symbols displayed in the first grid;

frame at least a portion of the first grid by using at least some of the marked boundary elements of the second grid to define a subportion frame, the subportion frame enclosing at least one symbol display position of the first grid;

evaluate symbol combinations formed from the symbols displayed in the symbol positions enclosed by the subportion frame for awards, the awards increasing the credit balance; and detect the input to cause the initiation of the payout, via the cashout device.

12. The wagering gaming device of claim 11, wherein the plurality of symbols stored in the memory include symbols representative of playing cards.

13. The wagering gaming device of claim 12, wherein evaluating symbol combinations formed from the symbols displayed in the symbol positions enclosed by the subportion frame for awards includes evaluating poker hands formed by the player card symbols enclosed in the subportion frame.

14. The wagering gaming device of claim 13, wherein the evaluated poker hands are the best five-card poker hand from the playing cards symbols enclosed by the subportion frame.

15. The wagering gaming device of claim 11, wherein the game circuitry is further configured to:

provide a plurality of selectable subportions; and receive a signal indicating a selection of one of the selectable subportions prior to mark one or more of the plurality of symbol display positions of a first grid by randomly selecting symbols to appear on the plurality of symbol display positions.

16. The wagering gaming device of claim 11, wherein the game circuitry is further configured to receive a signal indicating a location and shape of a subportion prior to mark one or more of the plurality of symbol display positions of a first grid by randomly selecting symbols to appear on the plurality of symbol display positions.

17. The wagering gaming device of claim 11, wherein the game circuitry is further configured to evaluate symbol combinations formed from the symbols displayed in the symbol positions of the first grid for awards, the awards increasing the credit balance.

18. A wagering gaming device comprising:

a display device configured to display:

a first grid of a plurality of symbol display positions; and a second grid of a plurality of boundary elements, the plurality of boundary elements positioned at least between some of the plurality of symbol display positions of the first grid;

a wager input device configured to receive currency or currency based tickets, the currency or currency based tickets establishing a credit balance, the credit balance being increasable and decreasable based at least on wagering activity;

a cashout device configured to receive an input to cause an initiation of a payout associated with the credit balance;

a memory device configured to store data related to a plurality of game reels, the data including arrangements of symbols associated with each of the game reels; and game circuitry configured to:

receive a wager signal to initiate a game of chance in response to placement of a wager, the wager decreasing the credit balance;

mark one or more of the plurality of symbol display positions of the first grid by spinning a first plurality of the game reels and stopping the first plurality of game reels to display symbols in the symbol display positions;

mark one or more of the plurality of boundary elements of the second grid, the boundary elements being marked independently of the symbols displayed in the first grid;

frame at least a portion of the first grid by using each of the marked boundary elements of the second grid to define a subportion frame, the subportion frame defined as a perimeter surrounding every symbol position in the first grid adjacent to the marked boundary elements, where the subportion frame encloses at least one symbol display position of the first grid;

evaluate symbol combinations formed from the symbols displayed in the symbol positions of the first grid enclosed by the subportion frame for awards, the awards increasing the credit balance; and detect the input to cause the initiation of the payout, via the cashout device.

19. The wagering gaming device of claim 18, wherein framing at least a portion of the first grid by using each of the marked boundary elements of the second grid to define a subportion frame includes marking outside edges of the subportion frame to display the subportion frame on the display device.

20. The wagering gaming device of claim 18, wherein the symbol positions in the first grid adjacent to the marked boundary elements include each symbol position above, below, left, right, and diagonal to the marked boundary elements.

* * * * *